US008326363B2

(12) United States Patent
Miura

(10) Patent No.: US 8,326,363 B2
(45) Date of Patent: Dec. 4, 2012

(54) PORTABLE TERMINAL, BASE STATION, AND METHOD OF SPECIFYING POSITION OF PORTABLE TERMINAL

(75) Inventor: Takanori Miura, Ichihara (JP)

(73) Assignee: Kyocera Corporation, Kyoto (JP)

(*) Notice: Subject to any disclaimer, the term of this patent is extended or adjusted under 35 U.S.C. 154(b) by 432 days.

(21) Appl. No.: 12/680,156

(22) PCT Filed: Sep. 26, 2008

(86) PCT No.: PCT/JP2008/067460
§ 371 (c)(1),
(2), (4) Date: May 6, 2010

(87) PCT Pub. No.: WO2009/041597
PCT Pub. Date: Apr. 2, 2009

(65) Prior Publication Data
US 2010/0222075 A1      Sep. 2, 2010

(30) Foreign Application Priority Data

Sep. 26, 2007 (JP) ................................. 2007-249737
Oct. 30, 2007 (JP) ................................. 2007-281688

(51) Int. Cl.
*H04Q 7/20* (2006.01)
(52) U.S. Cl. .................. 455/561; 455/456.1; 455/456.5; 455/67.11; 455/506; 455/524; 370/310.2; 370/310; 370/343; 342/450; 342/458; 342/464
(58) Field of Classification Search .................. 455/561, 455/456.1–557, 575.1, 550.1, 67.11, 445, 455/90.3, 412.1, 412.2, 558, 426.1, 426.2, 455/423–425, 403, 422.1, 500, 517, 504, 455/506, 507, 514, 524; 370/310, 310.2, 370/343; 342/450, 458, 464
See application file for complete search history.

(56) References Cited

U.S. PATENT DOCUMENTS

| 2002/0132625 | A1* | 9/2002 | Ogino et al. | 455/456 |
| 2003/0098811 | A1* | 5/2003 | Nikolai et al. | 342/458 |
| 2008/0274753 | A1* | 11/2008 | Attar et al. | 455/456.6 |

FOREIGN PATENT DOCUMENTS

| JP | 09-294287 | 11/1997 |
| JP | 11-252622 | 9/1999 |
| JP | 2007-043343 | 2/2007 |

OTHER PUBLICATIONS

Chinese language office action dated Apr. 27, 2012 and its English language translation issued in corresponding Chinese application 200880108339.6.

* cited by examiner

*Primary Examiner* — Keith Ferguson
(74) *Attorney, Agent, or Firm* — DLA Piper LLP (US)

(57) ABSTRACT

A portable terminal is provided, which includes a communication unit that transmits/receives a signal modulated by a predetermined modulation method to/from three or more base stations; a storage unit which stores in advance a plurality of propagation models indicating propagation environments of the signal for respective combinations of the base stations and stores in advance position information of the base stations; and a control unit that controls the communication unit and the storage unit; wherein the control unit specifies a propagation model that corresponds to a combination of the base stations among the plurality of propagation models stored in the storage unit based on the signal and calculates communicable distances of the signal based on the corresponding propagation model, calculates circles having the corresponding communicable distances as their radii and having positions of the base stations as their centers, respectively, obtains an overlapping area where the circles overlap one another, and specifies the center position of the overlapping area as the position of the portable terminal.

16 Claims, 14 Drawing Sheets

FIG. 3

| GS2 \ GS3 | CS NUMBER | COORDINATE NUMBER (LATITUDE, LONGITUDE) | BASE STATION C | BASE STATION D | BASE STATION E | BASE STATION F | BASE STATION G | BASE STATION H |
|---|---|---|---|---|---|---|---|---|
| | BASE STATION C | (XX, XX,) | | 3 (BIG CITY) | 0 (SUBURB) | 3 (BIG CITY) | 0 (SUBURB) | 0 (SUBURB) |
| | BASE STATION D | (XX, XX,) | 0 (SUBURB) | | 0 (SUBURB) | 3 (BIG CITY) | 0 (SUBURB) | 0 (SUBURB) |
| | BASE STATION E | (XX, XX,) | 0 (SUBURB) | 3 (BIG CITY) | | 3 (BIG CITY) | 0 (SUBURB) | 0 (SUBURB) |
| | BASE STATION F | (XX, XX,) | 3 (BIG CITY) | 0 (SUBURB) | 3 (BIG CITY) | | 3 (BIG CITY) | 3 (BIG CITY) |
| | BASE STATION G | (XX, XX,) | 0 (SUBURB) | 0 (SUBURB) | 0 (SUBURB) | 3 (BIG CITY) | | 0 (SUBURB) |
| | BASE STATION H | (XX, XX,) | 0 (SUBURB) | 0 (SUBURB) | 0 (SUBURB) | 3 (BIG CITY) | 0 (SUBURB) | |

| MODULATION METHOD | COMMUNICABLE DISTANCE (m) | |
|---|---|---|
| | UPWARD SIGNAL | DOWNWARD SIGNAL |
| BPSK | 522 | 670 |
| QPSK | 416 | 534 |
| 8PSK | 287 | 368 |
| 16QAM | 249 | 319 |
| 32QAM | 192 | 246 |
| 64QAM | 141 | 181 |

FIG. 11

| MODULATION METHOD | 300kHZ COMMUNICABLE DISTANCE (m) | | 900kHZ COMMUNICABLE DISTANCE (m) | |
|---|---|---|---|---|
| | UPWARD SIGNAL | DOWNWARD SIGNAL | UPWARD SIGNAL | DOWNWARD SIGNAL |
| BPSK | 241 | 522 | 180 | 389 |
| QPSK | 192 | 416 | 143 | 310 |
| 8PSK | 133 | 287 | 99 | 213 |
| 16QAM | 115 | 249 | 86 | 185 |
| 32QAM | 89 | 192 | 66 | 143 |
| 64QAM | 65 | 141 | 49 | 105 |

FIG. 15

| MODULATION METHOD | DOWNWARD SIGNAL | |
|---|---|---|
| | FOUR ANTENNAS | TWO ANTENNAS |
| BPSK | 522 | 360 |
| QPSK | 416 | 346 |
| 8PSK | 287 | 238 |
| 16QAM | 249 | 207 |
| 32QAM | 192 | 159 |
| 64QAM | 141 | 117 |

PORTABLE TERMINAL, BASE STATION, AND METHOD OF SPECIFYING POSITION OF PORTABLE TERMINAL

The present invention relates to a portable terminal such as a portable phone, a PHS (Personal Handy-Phone System) terminal, or the like, a base station, and a method of specifying the position of a portable terminal.

This application is a national stage of international application No. PCT/JP2008/067460 filed on Sep. 26, 2006 and claims priority under 35 USC 119 to Japanese Patent Applications JP 2007-249737 filed on Sep. 26, 2007 and JP 2007-281688 filed on Oct. 30, 2007, the entire contents of which are hereby incorporated by reference.

BACKGROUND ART

Patent Document 1 below discloses a method of searching for the position of travel equipment by a PHS, which can accurately search for the position of travel equipment such as a truck, a pallet for loading, or the like, by accurately estimating tolerance and accurately estimating a loading time.

According to this searching method, a PHS terminal is mounted on the travel equipment, estimated distances between the PHS terminal and three or more neighboring base stations are calculated from the radio field intensities of signals from the base stations, a plurality of circles having the positions of the base stations as their centers and having the estimated distances as their radii, respectively, is obtained, and then the position of the travel equipment on which the PHS terminal is mounted is obtained from the crossing ranges of the circles.

Also, if the position of the travel equipment is within a predetermined tolerance from a predetermined strongpoint position, it is determined that the travel equipment is in the strongpoint position.

Patent Document 1: Japanese Patent Application, First Publication No. 2007-43343

DISCLOSURE OF INVENTION

Problem to be Solved by the Invention

As described above, in the above-described related art, the position of the PHS terminal is detected by calculating the estimated distances between the terminal and respective base stations based on the radio field intensities of the signals. However, the congestion levels caused by buildings and the like differ in the center of a big city and in the suburbs of the city, and if the estimated distances are calculated simply based on the radio field intensities in the respective places, there may be a difference between the calculated estimated distances.

Also, in the above-described related art, the estimated distances between the PHS terminal and the base stations are calculated using only the radio field intensities as parameters, and the position of the PHS terminal is detected based on a plurality of circles having the positions of the base stations as their centers and having the estimated distances as their radii, respectively. However, this method has the problem that the accuracy in position detection can be improved only by increasing the number of base stations with which the PHS terminal communicates.

The invention has been made in consideration of the above-described circumstances, and an object of the invention is to provide a portable terminal, a base station, and a method of specifying the position of a portable terminal, which can specify the position of the portable terminal at higher accuracy than that of the related art by calculating appropriate communicable distances (corresponding to the estimated distances) of the signals transmittedlreceived by the portable terminal or the base stations in accordance with the environment where the signals are propagated.

Another object of the present invention is to provide a portable terminal, a base station, and a method of specifying the position of a portable terminal, which can specify the position of the portable terminal at higher accuracy than that of the related art even without increasing the number of communicating base stations.

Means for Solving the Problem

In order to achieve the above objects, as the first solution means for a portable terminal, the present invention adopts means including: a communication unit that transmits/receives a signal modulated by a predetermined modulation method to/from three or more base stations; a storage unit which stores in advance a plurality of propagation models indicating propagation environments of the signal for respective combinations of the base stations and stores in advance position information of the base stations; and a control unit that controls the communication unit and the storage unit; wherein the control unit specifies a propagation model that corresponds to a combination of the base stations among the plurality of propagation models stored in the storage unit based on the signal and calculates communicable distances of the signal based on the corresponding propagation model, calculates circles having the corresponding communicable distances as their radii and having positions of the base stations as their centers, respectively, obtains an overlapping area where the circles overlap one another, and specifies the center position of the overlapping area as the position of the portable terminal.

As the second solution means for a portable terminal, the first solution means adopts means wherein if the overlapping area does not exist, the control unit changes the specified propagation model to another propagation model among the plurality of propagation models stored in the storage unit, obtains the overlapping area based on the corresponding propagation model, and stores the corresponding propagation model in the storage unit.

As the third solution means for a portable terminal, the first or second solution means adopts means wherein the communication unit transmits/receives the signal of which the modulation method is changed according to the communication state to/from the base stations; and the control unit calculates a concentric circle which is smaller than the circles and has the communicable distance based on the modulation method having a communicable range that is narrower than that of the modulation method of the signal as its radius, and limits the overlapping area by the concentric circle.

As the fourth solution means for a portable terminal, the first or second solution means adopts means wherein the communication unit performs transmission/reception of the signal with one of the base stations through a communication channel, and performs transmission/reception of the signal with other base stations through a control channel.

As the fifth solution means for a portable terminal, the present invention adopts means including: a communication unit that transmits/receives a first signal of which the modulation method is changed according to a communication state to/from a first base station and transmits/receives a second signal of which the modulation method is fixed to/from a plurality of second base stations that are different from the first base station; and a control unit that specifies its own position based on the first and second signals; wherein the control unit calculates a first communicable distance that is the current communicable distance of the first signal, and calculates a first circle which has the corresponding first communicable distance as its radius and has the first base station as its center; calculates a second communicable distance from the modulation method having a communicable distance that is shorter than that of the current modulation method of the first signal, and calculates a second circle which has the corresponding second communicable distance as its radius and has the first base station as its center; calculates a third circle which has a third communicable distance between the first communicable distance and the second communicable distance as its radius and has the first base station as its center; calculates a fourth communicable distance that is the communicable distance of the second signal, and calculates a plurality of fourth circles which have the corresponding fourth communicable distance as their radii and have the second base station as their centers, respectively; and changes the communicable distance of the first signal from the first communicable distance to the third communicable distance by a process of changing the communicable distance, and if the communication unit is able to transmit/receive the first signal of which the communicable distance has become the third communicable distance, specifies the center of an overlapping area between an area surrounded by the second circle and the third circle and the fourth circle as its position, while if the communication unit is unable to transmit/receive the first signal of which the communicable distance has become the third communicable distance, specifies the center of an overlapping area between an area surrounded by the first circle and the third circle and the fourth circle as its position.

As the sixth solution means for a portable terminal, the fifth solution means adopts means wherein the control unit changes the bandwidth of the first signal or changes the bandwidth and a modulation method of the first signal as the process of changing the communicable distance.

As the seventh solution means for a portable terminal, the fifth or sixth solution means adopts means wherein the communication unit has an adaptive array antenna composed of a plurality of antenna elements, and the control unit reduces the number of antenna elements of the communication unit that is used in transmission/reception of the first signal, or reduces the number of antenna elements of the communication unit that is used in transmission/reception of the first signal and changes the modulation method of the first signal as the communicable distance change processing.

As the eighth solution means for a portable terminal, one of the fifth to seventh solution means adopts means wherein the first signal is a signal that is transmitted/received through the communication channel, and the second signal is a signal that is transmitted/received through the control channel.

As the first solution means for a base station, in a base station that transmits/receives a signal modulated by a predetermined modulation methods to/from a portable terminal communicating with three or more base stations, the present invention adopts means including: a communication unit that transmits/receives the signal to/from the portable terminal; a storage unit which stores in advance a plurality of propagation models indicating propagation environments of the signal that the portable terminal transmits/receives for respective combinations of the base stations with which the portable terminal communicates, and stores in advance position information of the base stations; and a control unit that controls the communication unit and the storage unit; wherein the control unit acquires communication information about the base stations with which the portable terminal communicates through the communication unit and a modulation method of the signal in the communication from the portable terminal, specifies a propagation model which corresponds to a combination of the base stations with which the portable terminal communicates and is stored in the storage unit based on the corresponding communication information and the signal that the communication unit transmits to or receives from the portable terminal and calculates communicable distances of the signal that the portable terminal transmits to or receives from the respective base stations based on the corresponding propagation model, calculates circles having the corresponding communicable distances as their radii and having positions of the base stations as their centers, respectively, obtains an overlapping area where the circles overlap one another, and specifies the center position of the overlapping area as the position of the portable terminal.

As the second solution means for a base station, the first solution means adopts means wherein if the overlapping area does not exist, the control unit changes the specified propagation model to another propagation model, obtains the overlapping area based on the corresponding propagation model, and stores the corresponding propagation model in the storage unit.

As the third solution means for a base station, the second solution means adopts means wherein the communication unit transmits/receives the signal of which the modulation method is changed according to the communication state to/from the portable terminal; and the control unit calculates a concentric circle which is smaller than the circles and has the communicable distance based on the modulation method having a communicable range that is narrower than that of the modulation method of the signal as its radius, and limits the overlapping area by the concentric circle.

As the fourth solution means for a base station, in a first base station that transmits/receives a first signal to/from a portable terminal which transmits/receives the first signal of which the modulation method is changed according to a communication state to/from the first base station and transmits/receives a second signal of which the modulation method is fixed to/from other second base stations that are different from the first base station, the present invention adopts means including: a communication unit that transmits/receives the first signal to/from the portable terminal; and a control unit that specifies a position of the portable terminal based on the first signals; wherein the control unit acquires communication information about communication of the portable terminal with the second base stations from the first signal that the communication unit receives from the portable terminal; calculates a first communicable distance that is the current communicable distance of the first signal, and calculates a first circle which has the corresponding first communicable distance as its radius and has the first base station as its center; calculates a second communicable distance from the modulation method having a communicable distance that is shorter than that of the current modulation method of the first signal, and calculates a second circle which has the corresponding second communicable distance as its radius and has the first base station as its center; calculates a third circle which has a third communicable distance between the first communicable distance and the second communicable distance as its radius and has the first base station as its center; calculates a fourth communicable distance that is the communicable distance of the second signal based on the communication information, and calculates a plurality of fourth circles which have the corresponding fourth communicable distance as their radii and have the second base station as their centers, respectively; and changes the communicable distance of the first signal from the first communicable distance to the third communicable distance by a process of changing the communicable distance, and if the first signal of which the communicable distance has become the third communicable distance is able to be transmitted to or received from the portable terminal, specifies the center of an overlapping area between an area surrounded by the second circle and the third circle and the fourth circle as the position of the portable terminal, while if the first signal of which the communicable distance has become the third communicable distance is unable to be transmitted to or received from the portable terminal, specifies the center of an overlapping area between an area surrounded by the first circle and the third circle and the fourth circle as the position of the portable terminal.

As the fifth solution means for a base station, the fourth solution means adopts means wherein the control unit changes the bandwidth of the first signal or changes the bandwidth and a modulation method of the first signal by the process of changing the communicable distance.

As the sixth solution means for a base station, the fourth solution means adopts means wherein the communication unit has an adaptive array antenna composed of a plurality of antenna elements, and the control unit reduces the number of antenna elements of the communication unit that is used in transmission/reception of the first signal, or reduces the number of antenna elements of the communication unit that is used in transmission/reception of the first signal and changes the modulation method of the first signal.

As the first solution means for a method of specifying the position of a portable terminal that transmits/receives a signal in which a predetermined modulation method is used to/from three or more base stations, the present invention adopts means including: based on the signal that the portable terminal transmits to or receives from the base stations, calculating communicable distances based on a propagation model and the modulation method; calculating a plurality of circles having the corresponding communicable distances as their radii and having positions of the base stations as their centers, respectively; obtaining an overlapping area where the circles overlap one another; and specifying the center position of the overlapping area as the position of the portable terminal.

As the second solution means for a method of specifying the position of a portable terminal that transmits/receives a first signal of which the modulation method is changed according to a communication state to/from a first base station and transmits/receives a second signal of which the modulation method is fixed to/from a plurality of second base stations that are different from the first base station, the present invention adopts means including: calculating a first communicable distance that is the current communicable distance of the first signal, and calculating a first circle which has the corresponding first communicable distance as its radius and has the first base station as its center; calculating a second communicable distance from the modulation method having a communicable distance that is shorter than that of the current modulation method of the first signal, and calculating a second circle which has the corresponding second communicable distance as its radius and has the first base station as its center; calculating a third circle which has a third communicable distance between the first communicable distance and the second communicable distance as its radius and has the first base station as its center; calculating a fourth communicable distance that is the communicable distance of the second signal, and calculating a plurality of fourth circles which have the corresponding fourth communicable distance as their radii and have the second base station as their centers, respectively; and changing the communicable distance of the first signal from the first communicable distance to the third communicable distance by a process of changing the communicable distance, and if the portable terminal is able to transmit/receive the first signal of which the communicable distance has become the third communicable distance, specifying the center of an overlapping area between an area surrounded by the second circle and the third circle and the fourth circle as the position of the portable terminal, while if the portable terminal is unable to transmit/receive the first signal of which the communicable distance has become the third communicable distance, specifying the center of an overlapping area between an area surrounded by the first circle and the third circle and the fourth circle as the position of the portable terminal.

Effect of the Invention

As described above, according to the invention, the position of the portable terminal can be specified with higher accuracy than that of the related art by calculating appropriate communicable distances of signals in accordance with the environment where the signals are propagated.

Also, according to the present invention, a third circle which has a third communicable distance between the first communicable distance and the second communicable distance as its radius and has the first base station as its center is calculated, and the communicable distance of the first signal is changed from the first communicable distance to the third communicable distance by a process of changing the communicable distance. If the first signal of which the communicable distance has become the third communicable distance is able to be transmitted to or received from the portable terminal, the center of an overlapping area between an area surrounded by the second circle and the third circle and the fourth circle is specified as the position of the portable terminal, while if the first signal of which the communicable distance has become the third communicable distance is unable to be transmitted to or received from the portable terminal, the center of an overlapping area between an area surrounded by the first circle and the third circle and the fourth circle is specified as the position of the portable terminal. Accordingly, the position of the portable terminal can be specified at higher accuracy than that of the related art even without increasing the number of communicating base stations.

BRIEF DESCRIPTION OF THE DRAWINGS

FIG. 3 is a diagram illustrating a CS selection list stored in a storage unit 4 of a PHS terminal A according to the first embodiment of the present invention.

FIG. 11 is a view illustrating communicable distances of an upward signal and a downward signal for each modulation method and bandwidth that a PHS terminal A1 uses for the communication according to the second embodiment of the present invention.

FIG. 15 is a view illustrating a communicable distance of a downward signal for each modulation method and receiving antenna for a signal that a PHS terminal B1 uses for the communication according to the third embodiment of the present invention.

REFERENCE SYMBOLS

| | |
|---|---|
| 1: | COMMUNICATION UNIT |
| 2: | MANIPULATION UNIT |
| 3: | DISPLAY UNIT |
| 4: | STORAGE UNIT |
| 5: | CONTROL UNIT |
| 11: | ADAPTIVE ARRAY ANTENNA COMMUNICATION UNIT |
| 11b: | MIXER |
| 11c: | FIRST LOCAL OSCILLATOR |
| 11d: | SECOND LOCAL OSCILLATOR |
| 11e: | LOCAL OSCILLATOR SWITCHING UNIT |
| 11f: | ADAPTIVE ARRAY ANTENNA PROCESSING UNIT |
| 21: | RECEIVING UNIT |
| 21a, 11a: | ANTENNA |
| 21b: | FILTER SWITCHING UNIT |
| 21c: | FIRST FILTER |
| 21d: | SECOND FILTER |
| 21e: | MIXER |
| 21f: | LOCAL OSCILLATOR |
| 21g: | RECEPTION PROCESSING UNIT |
| 22: | TRANSMISSION UNIT |
| 23: | MANIPULATION UNIT |
| 24: | DISPLAY UNIT |
| 25: | STORAGE UNIT |
| 26: | CONTROL UNIT |
| A, A1, B1: | PHS TERMINAL |
| B, C, D, CS11, CS12, CS13: | BASE STATION |

BEST MODE FOR CARRYING OUT THE INVENTION

Hereinafter, with reference to the accompanying drawings, first to third embodiments of the present invention will be described. The respective embodiments relate to a PHS (Personal Handy-phone System) terminal that is a kind of portable terminal, and a method of detecting the position thereof.

First Embodiment

First, a first embodiment of the invention will be described.

Figure 1:
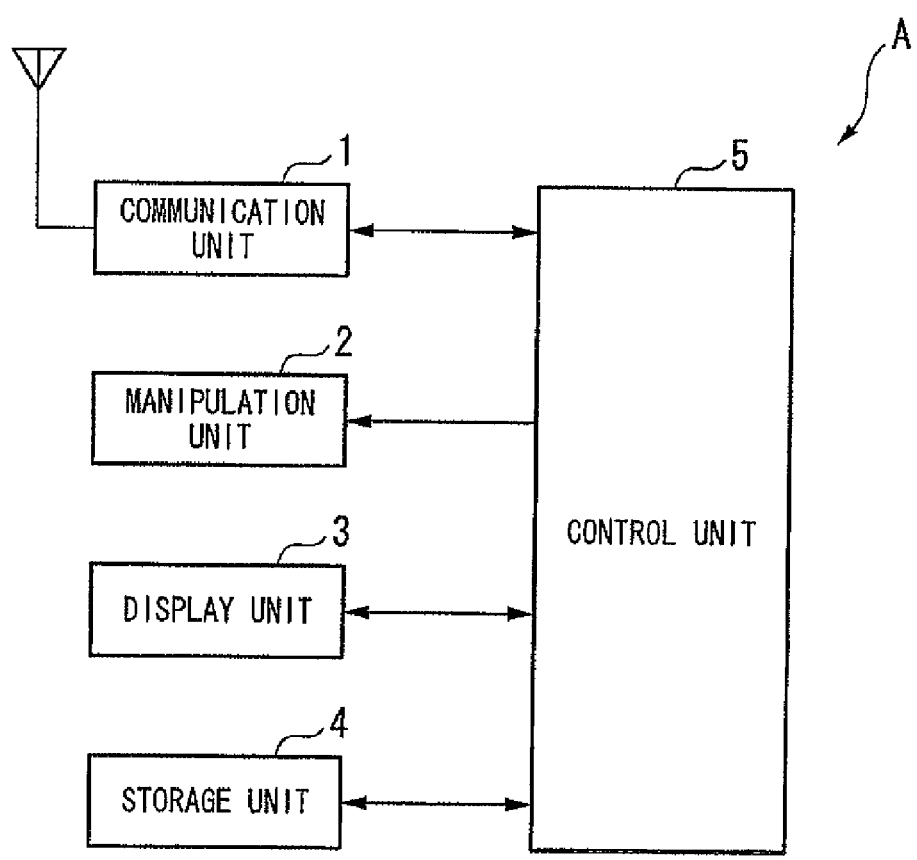
FIG. 1 is a functional block diagram of a PHS terminal A according to a first embodiment of the present invention.

FIG. 1 is a functional block diagram of a PHS terminal A according to a first embodiment of the present invention. The PHS terminal A, as illustrated in FIG. 1, includes a communication unit 1, a manipulation unit 2, a display unit 3, a storage unit 4, and a control unit 5.

The communication unit 1, under the control of the control unit 5, transmits/receives various kinds of signals to/from a PHS base station through a communication channel and a control channel. Also, a communication network composed of the PHS terminal A and base stations adopts an adaptive modulation method that changes the modulation method of a signal (i.e. communication signal) that is transmitted/received through a communication channel in accordance with a communication state, and the communication unit 1 adopts this adaptive modulation method.

The manipulation unit 2 is composed of various kinds of manipulation keys such as a power key, numeric keys, function keys, and the like, and outputs user's manipulation instructions for the manipulation keys to the control unit 5.

The display unit 3, for example, may be a liquid crystal monitor, an organic EL monitor, or the like, and displays various kinds of scenes composed of images, characters, and the like, based on the signals input from the control unit 5.

The storage unit 4 is composed of a ROM (Read Only Memory) and a RAM (Random Access Memory). The ROM stores a predetermined control program that is executed by the control unit 5, and the RAM serves as a predetermined work area when the control unit 5 executes the control program. Also, the ROM stores a CS selection list in which propagation models that indicate propagation environments of signals for each combination of the base stations are registered.

The control unit 5 controls the whole operation of the PHS terminal A based on the predetermined control program prestored in the ROM of the storage unit 4, various kinds of manipulation instructions received through the manipulation unit 2, and various kinds of signals input from the communication unit 1. In this case, the control program stored in the ROM is provided with a position detection program, and the details of the position detection processing executed by the control unit 5 based on the position detection program will be described later as the operation of the PHS terminal A.

Figure 2:
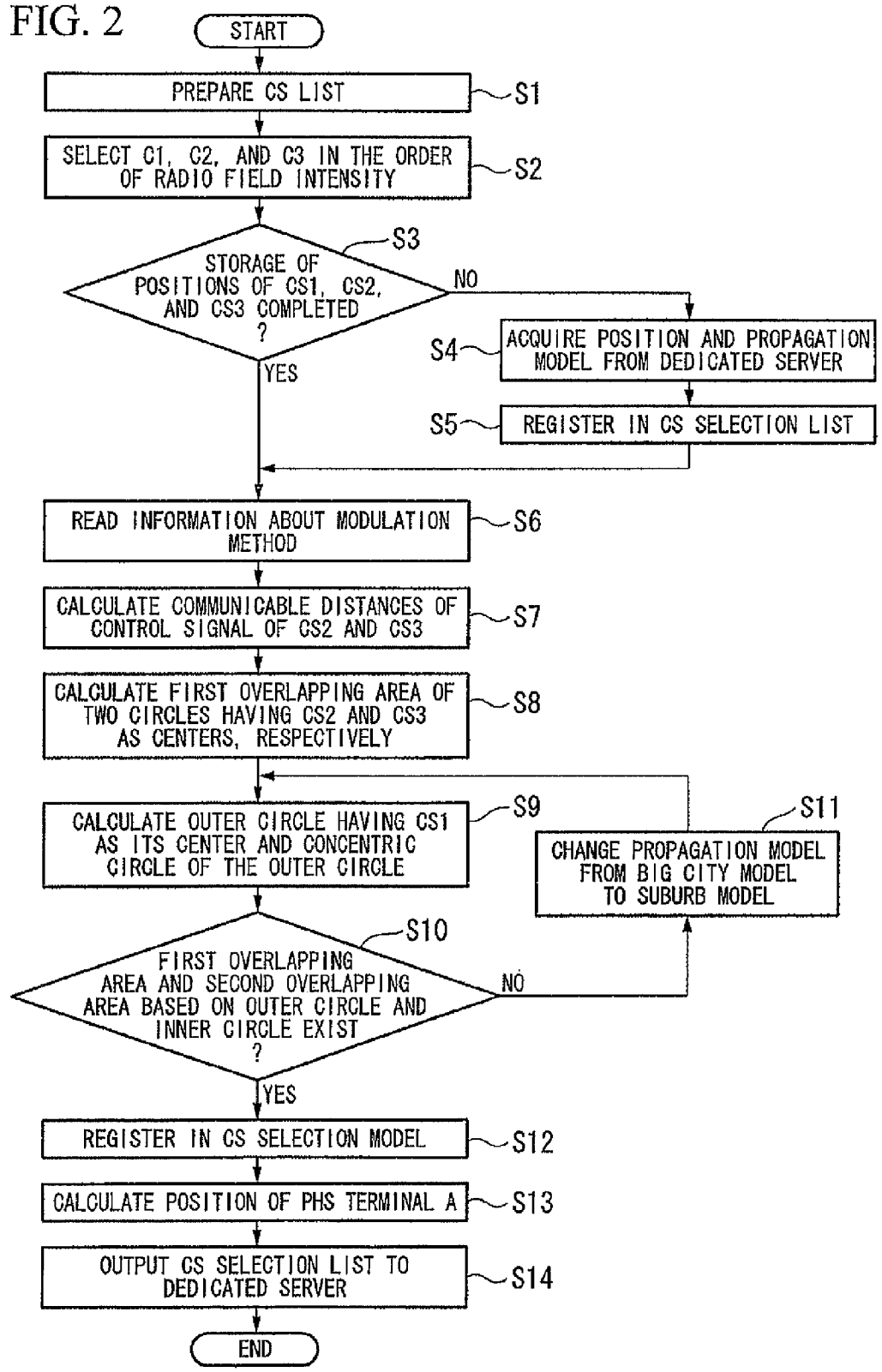
FIG. 2 is a flowchart illustrating an operation of a PHS terminal A according to the first embodiment of the present invention.

Next, the position detection processing of the PHS terminal A as constructed above will be described in detail with reference to FIG. 2 that is a flowchart illustrating the operation of the PHS terminal A, and further FIGS. 3, 4, 5, 6, and 7.

Figures 4, 5:
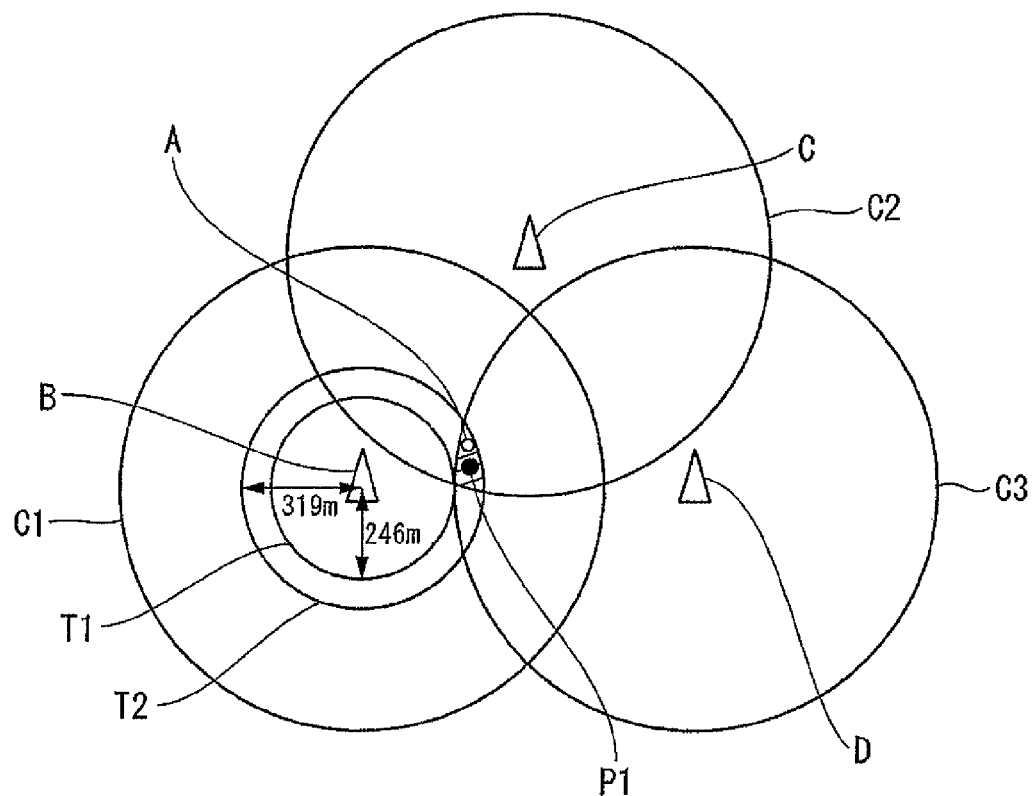
FIG. 4 is a view illustrating communicable distances of an upward signal and a downward signal for each modulation method of a signal of a PHS terminal A according to the first embodiment of the present invention.
FIG. 5 is a diagram illustrating position detection in a wireless communication system composed of a PHS terminal A, a base station B, a base station C, and a base station D according to the first embodiment of the present invention.

FIG. 3 is a diagram illustrating a CS selection list stored in a storage unit 4 of a PHS terminal A according to a first embodiment of the present invention, and FIG. 4 is a view illustrating communicable distances of an upward signal and a downward signal for each modulation method of a signal of a PHS terminal A according to a first embodiment of the present invention. FIG. 5 is a diagram illustrating position detection in a wireless communication system composed of a PHS terminal A, a base station B, a base station C, and a base station D according to a first embodiment of the present invention.

Figure 6:
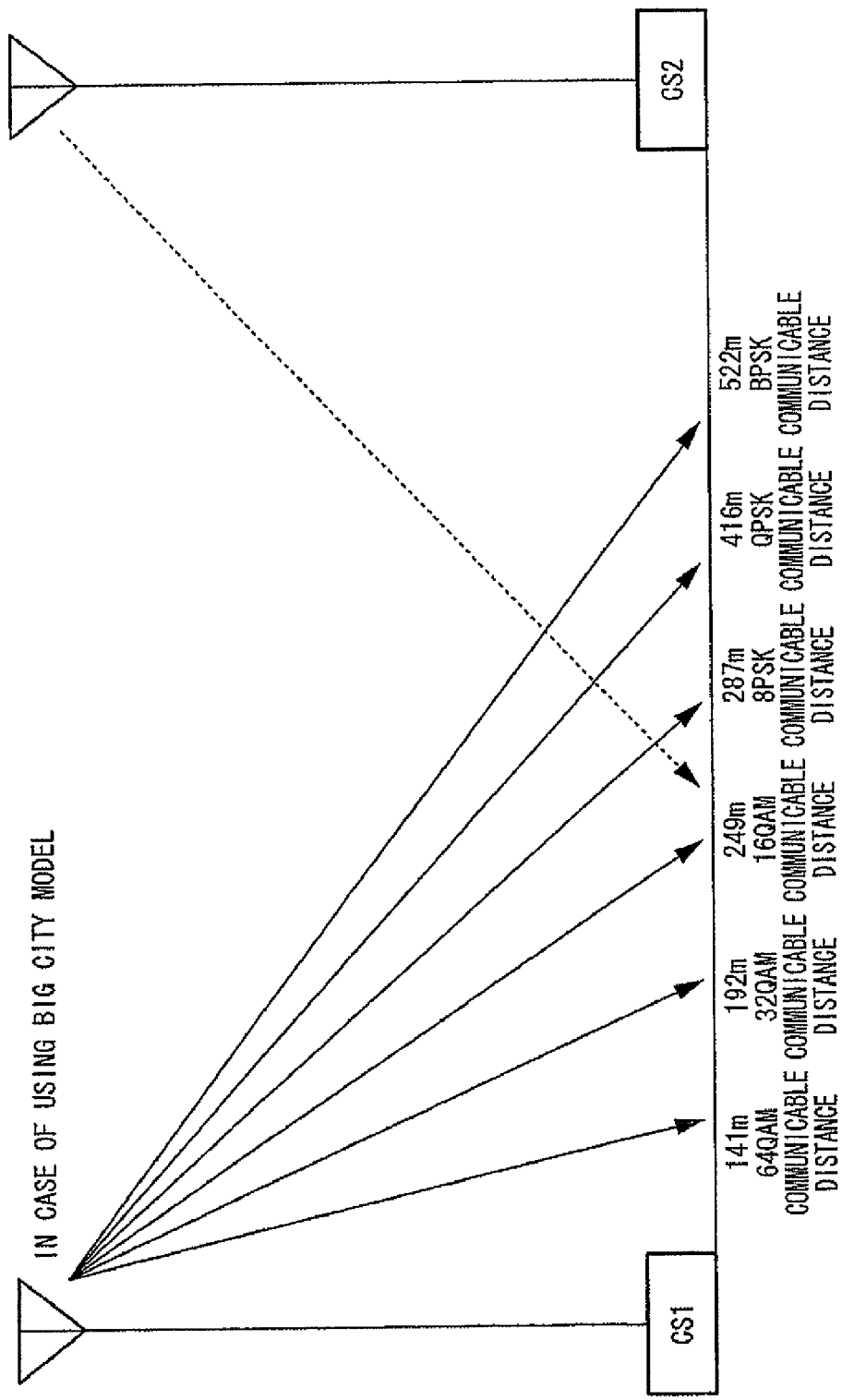
FIG. 6 is a diagram illustrating a communicable distance of a communication signal from a base station CS1 and a communicable distance of a control signal from a base station CS2 which a PHS terminal A calculates based on the big city model according to the first embodiment of the present invention.
Figure 7:
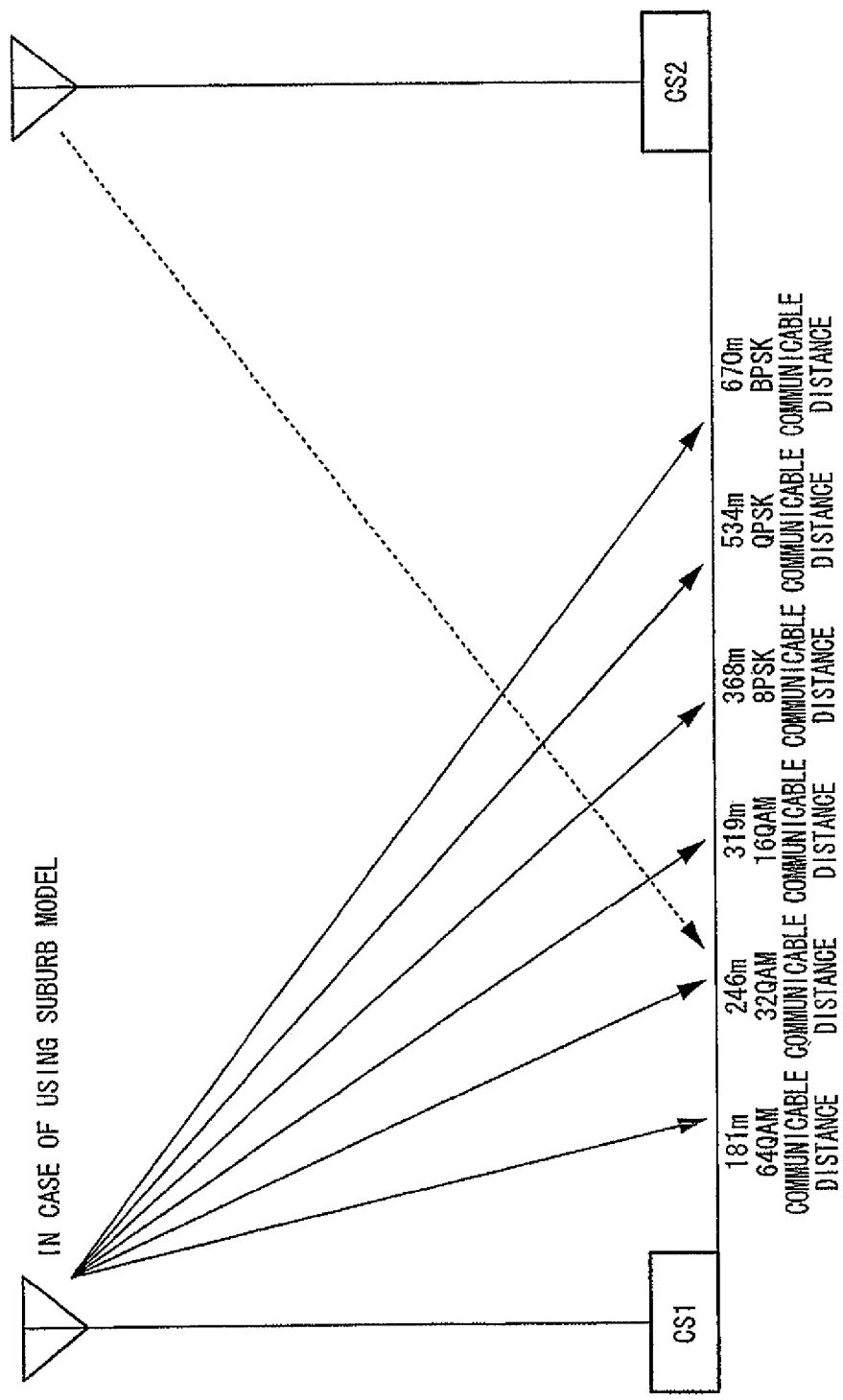
FIG. 7 is a diagram illustrating a communicable distance of a communication signal from a base station CS1 and a communicable distance of a control signal from a base station CS2 which a PHS terminal A calculates based on the suburb model according to the first embodiment of the present invention.

Also, FIG. 6 is a diagram illustrating a communicable distance of a communication signal from a base station CS1 and a communicable distance of a control signal from a base station CS2 which a PHS terminal A calculates based on the big city model according to a first embodiment of the present invention, and FIG. 7 is a diagram illustrating a communicable distance of a communication signal from a base station CS1 and a communicable distance of a control signal from a base station CS2 which a PHS terminal A calculates based on the suburb model according to a first embodiment of the present invention.

Generally, the PHS terminal transmits/receives signals to/from a plurality of base stations through a control channel, and transmits/receives signals to/from one base station of which the position has been registered through a communication channel.

The PHS terminal A calculates a communicable distance of the signal based on the modulation method of the signal that the terminal transmits to or receives from the three or more base stations through the control channel and the communication channel and the propagation models of the CS selection list stored in the storage unit 4, and detects the position of the PHS terminal A based on the communicable distance of the signal.

The control unit 5 of the PHS terminal A measures the radio field intensities of the control signals that the communication unit 1 receives from the plurality of base stations in the neighborhood of the terminal through the control channel, and prepares the CS (Cell Station) list in which the radio field intensities measured for the respective base stations are registered. The control unit 5 stores the CS list in the storage unit 4 (step S1), and transmits a control signal to the communication unit 1 so as to register the position of the terminal in the base station B having the highest signal receiving intensity based on the CS list.

The control unit 5 selects the base stations CS1, CS2, and CS3 in the order of their radio field intensity based on the CS list (step S2). In this case, the base station B is selected as CS1, the base station C is selected as CS2, and the base station D is selected as CS3.

The control unit 5 determines whether the positions of the base stations B, C, and D, which correspond to CS1, CS2, and CS3, respectively, have been stored in the storage unit 4 (step S3). If the determination in step S3 is "NO", the control unit 5 acquires the positions of the base stations B, C, and D stored in a dedicated server through the base station B, and acquires the propagation models that correspond to the combinations of the base stations selected as CS1, CS2, and CS3 (step S4). In this case, the control unit 5 stores the position of the base station B in the storage unit 4, and registers the positions of the base stations C and D, which are CS2 and CS3, respectively, and propagation models in the CS selection list (step S5).

Referring to FIG. 3, the details of the CS selection list will be described in detail.

FIG. 3 shows the CS selection list in the case where the base station B is CS1, in which propagation models are registered for the respective combinations of the base stations of CS2 and CS3, and the CS numbers of the respective base stations and the latitudes/longitudes as the positions of the respective base stations are registered in CS2 and CS3.

The propagation models are classified into a big city model and a suburb model, and in the CS selection list, "3" is registered in the case of the big city model, while "0" is registered in the case of the suburb model. The propagation model value is applied to one correction value CM[dB] of a parameter of Okumura-Hata Curve (i.e. PCS extension Hata model) formula as indicated in Equation (1) below that is used to calculate the communicable distance of the signal. The details of the Okumura-Hata curve (i.e. PCS extension Hata model) formula as indicated in Equation (1) will be described later.

The control unit 5, after the processing in step S5, reads information about the base station B of CS1 stored in the storage unit 4 and the modulation method of the communication signal that the communication unit 1 transmits and receives (step S6). In this case, the information about the modulation method is the modulation method that the control unit 5 has stored in the storage unit 4 based on the communication signal that the communication unit 1 transmits/receives, and is used in calculating the communicable distance of the downward signal of the communication signal in step S9.

The control unit 5, if the determination in step S3 is "YES", i.e. if the positions of the base stations B, C, and D and the propagation models have already been registered in the CS selection list of the selection unit 4, the processing in step S6 is executed.

The control unit 5, after the processing in step S6, calculates the communicable distance of the downward signal of the control signal which the communication unit 1 transmits to or receives from the base station C that is CS2 and the base station D that is CS3 based on the propagation model values and the modulation method registered in the CS selection list (step S7). In this case, the modulation method of the control channel is QPSK (Quadrature Phase Shift Keying), and is not changed.

The communicable distance of the downward signal of the control signal in step S7 is calculated based on the Okumura-Hata curve (i.e. PCS extension Hata model) formula as indicated in Equation (1) below.

$$Lp=46.3+33.9\log f-13.82 hb-a(hm)+(44.9-6.55\log hb)\log d+CM \quad (1)$$

In Equation (1), Lp is a propagation loss [dB], f is a frequency [MHz], hb is the height [m] of an antenna of a base station, hm is the height [m] of an antenna of a mobile station, d is a communication distance [km], a(hm) is a correction item for the height of the antenna of the mobile station, and CM is a corrected value [dB] of the propagation model.

In step S7, by substituting the propagation loss for the propagation loss Lp in Equation (I), the control unit 5 calculates the communication distance d. In this case, the communication distance d is the communicable distance in the embodiment of the present invention.

In this case, the propagation loss substituted for in Equation (1) is calculated by the control unit 5 through substitution of parameters for the receiving sensitivity based on the modulation method in Equation (2) below.

$$Lp=\text{(equivalent isotropically radiated power)}-\text{(receiving sensitivity based on modulation method)}+\text{(receiving antenna gain)} \quad (2)$$

Hereinafter, an example that indicates the receiving sensitivity that differs according to the modulation method is shown.

| Modulation Method | Receiving Sensitivity (dBuV) |
|---|---|
| BPSK | 12.5 |
| QPSK | 16.0 |
| 8PSK | 20.0 |
| 16QAM | 22.0 |
| 32QAM | 26.0 |
| 64QAM | 28.0 |

Based on Equations (1) and (2), if the propagation model is a suburb model, the communicable distances calculated for each modulation method are shown in FIG. 4.

After the processing of step S7, the control unit 5 calculates circles having the positions of the base station C that is CS2 and the base station D that is CS3 as their centers and having the communicable distances of the downward signal of the control signal calculated in step S7 as their radii, respectively, and calculates a first overlapping area between the two circles (step S8).

In this case, in step S8, the circle having the position of the base station C that is CS2 as its center is a circle C2 in FIG. 5, and the circle having the position of the base station D that is CS3 as its center is a circle C3 in FIG. 5. The control unit 5 calculates the area where the circle C2 and the circle C3 overlap each other as the first overlapping area.

The control unit 5 calculates the communicable distance of the downward signal of the communication signal from Equations (1) and (2) based on the modulation method of the communication signal read from the storage unit 4 in step S6 and the propagation model value registered in the CS selection list stored in the storage unit 4, and calculates a circle (hereinafter referred to as an "outer circle") having the communicable distance as its radius and having the position of the base station B as its center. Also, the control unit 5 calculates the communicable distance from Equations (1) and (2) based on the modulation method having a communicable distance that is narrower than that of the modulation method of the current communication signal and the propagation model value registered in the CS selection list stored in the storage unit 4, and calculates a circle (hereinafter referred to as an "inner circle") that is the concentric circle of the outer circle having the communicable distance as its radius (step S9).

In this case, the outer circle calculated in step 9 is a circle T1 in FIG. 5, and the inner circle is a circle T2 in FIG. 5. In this case, the circle T1 as shown in FIG. 5 has the modulation method of the communication signal of 16QAM, and in the case where the propagation model is a suburb model, it indicates the outer circle calculated by the control unit 5. Also, since the modulation method of the communication signal is 16QAM, the circle T2 of FIG. 5 indicates the inner circle calculated by the control unit 5 based on the modulation method of 32QAM having a communicable distance that is narrower than that of 16QAM and the fact that the propagation model is the suburb model.

After the step S9, the control unit 5 determines whether an area (i.e. the second overlapping area), in which the first overlapping area calculated in step S8 overlaps a limited area obtained by subtracting an area surrounded by the inner circle from the outer circle, exists (step S10).

The control unit 5, if the determination in step S10 is "NO", changes the propagation model from the big city model to the suburb model (step S11), recalculates the outer circle and the inner circle in step S9 based on "0" that is the suburb model value, and then re-executes step S10 based on the recalculated outer circle and inner circle.

In this case, the second overlapping area is an area indicated by slanting lines in FIG. 5.

The processing in step S10 will be described in detail with reference to FIG. 6.

For example, if the control unit 5 determines "NO" in the processing in step S10 in the case where the modulation method of the communication signal is 16QAM, the propagation model is the big city model, and thus the communicable distance of the communication signal from the CS1 of 16QAM as shown in FIG. 6 becomes narrow. In this case, the communicable distance of the communication signal does not overlap the communicable distance of the control signal from CS2 that is indicated by a dotted arrow in FIG. 6, and thus the second overlapping area does not exist.

Accordingly, in step S11, the control unit 5 changes the propagation model to the suburb model, makes the communicable distance of the communication signal from the CS1 of 16QAM as shown in FIG. 7 and the communicable distance of the control signal from the CS2 as indicated by a dotted arrow overlap each other, and thus obtains the second overlapping area accordingly in step S10.

However, in the case of calculating a communicable distance of the communication signal that corresponds to the radius of the outer circle using the suburb model, the second overlapping area that is unnecessarily large may be calculated, and thus in the case of detecting the center position of the second overlapping area as the position of the PHS terminal A in step S13, a difference between the detected position and the actual position of the PHS terminal A may become greater.

The control unit 5, if the determination in step S10 is "YES", records the propagation mode used to calculate the outer circle and the inner circle in step S9 in the CS selection list (step S12), calculates the center position of the second overlapping area as the position of the PHS terminal A, and displays the position of the PHS terminal A on the display unit 3 using a map so that a user can visually recognize the same (step S13). In this case, the position of the PHS terminal A calculated in step S13 is the center point P1 of the second overlapping area indicated by the slanting lines in FIG. 5.

Then, the control unit 5 outputs the CS selection list stored in the storage unit 4 to an external dedicated server through the communication unit 1 (step S14).

As described above, according to an embodiment of the present invention, the storage unit 4 stores the CS selection list in which propagation models are registered for the respective base stations that the communication unit 1 transmits/receives the signal to/from. The control unit 5 calculates the communicable distance of the control signal based on the propagation model value, and obtains the first overlapping area in which the circles, which have the communicable distances of the control signal as their radii, and having the base station C that is CS2 and the base station D that is CS3 as their centers, respectively, overlap each other. The control unit 5 calculates the outer circle and the inner circle around the base station B that is CS1 based on the corresponding propagation model, and calculates the second overlapping area based on the outer circle and the inner circle, and detects the center position of the second overlapping area as the position of the PHS terminal A. Accordingly, the appropriate communicable distance is calculated according to the signal propagating environment, and thus the position of the mobile terminal can be detected at a higher accuracy than that of the related art.

As described above, although the first embodiment of the present invention has been described, the present invention is not limited thereto, and the following modifications may be considered.

(1) In the above-described embodiment, the communicable distance of the signal is calculated using a big sity model and a suburb model as the propragation models, but the present invention is not limited thereto.

For example, by using more detailed values in accordance with the scale of the big city model, it is possible to calculate the communicable distance of the communication signal based on a more appropriate value, and thus it is possible to reduce the difference between the positions of the PHS terminal A that is detected based on the second overlapping area calculated using the outer circle having the communicable distance as its radius.

(2) In the above-described embodiment, the position detection processing is performed by the PHS terminal A, but the present invention is not limited thereto, and the base station may perform the position detection of the PHS terminal A.

For example, the PHS terminal A may acquire the positions of the base station C that is CS2 and the base station D that is CS3, the modulation method of the control signal, and the CS selection list, and the base station B that is CS1 may perform the position detection of the PHS terminal A based on the positions of CS2 and CS3, the modulation method of the control signal, the propagation model of the CS selection list, and the position and the modulation method of the communication signal of the base station B.

(3) In the above-described embodiment, if the determination in step 10 is "NO", i.e. if the second overlapping area does not exist, the second overlapping area is obtained by recalculating the outer circle and the inner circle around the base station B that is CS1 through the change of the propagation model. However, the present invention is not limited thereto.

For example, the second overlapping area may be obtained by calculating circles around the base station C that is CS2 and the base station D that is C3 based on the changed propagation model.

(4) In the above-described embodiment, the communicable distance of the signal is calculated based on the modulation method and the position is detected based on the calculated communicable distance. However, the present invention is not limited thereto.

For example, the communicable range of the signal may be calculated based on the receiving bandwidth of the signal, FER (frame error rate), and the like, rather than the modulation method, and the position of the PHS terminal A may be detected.

(5) In the above-described embodiment, the communicable distance is calculated using an Okumura-Hata Curve (i.e. PCS extension Hata model) formula. However, the present invention is not limited thereto.

For example, the communicable distance may be calculated using a Walfisch-Ikegami equation or a Sakagami equation, rather than an Okumura-Hata Curve (i.e. PCS extension Hata model) formula, and the position of the PHS terminal A may be detected.

(6) In the above-described embodiment, the position detection is performed mainly using the communicable distance of the downward signal. However, the present invention is not limited thereto.

For example, the position detection may be performed using the communicable distance obtained from the modulation method of an upward signal.

Second Embodiment

Next, a second embodiment of the invention will be described.

Figure 8:
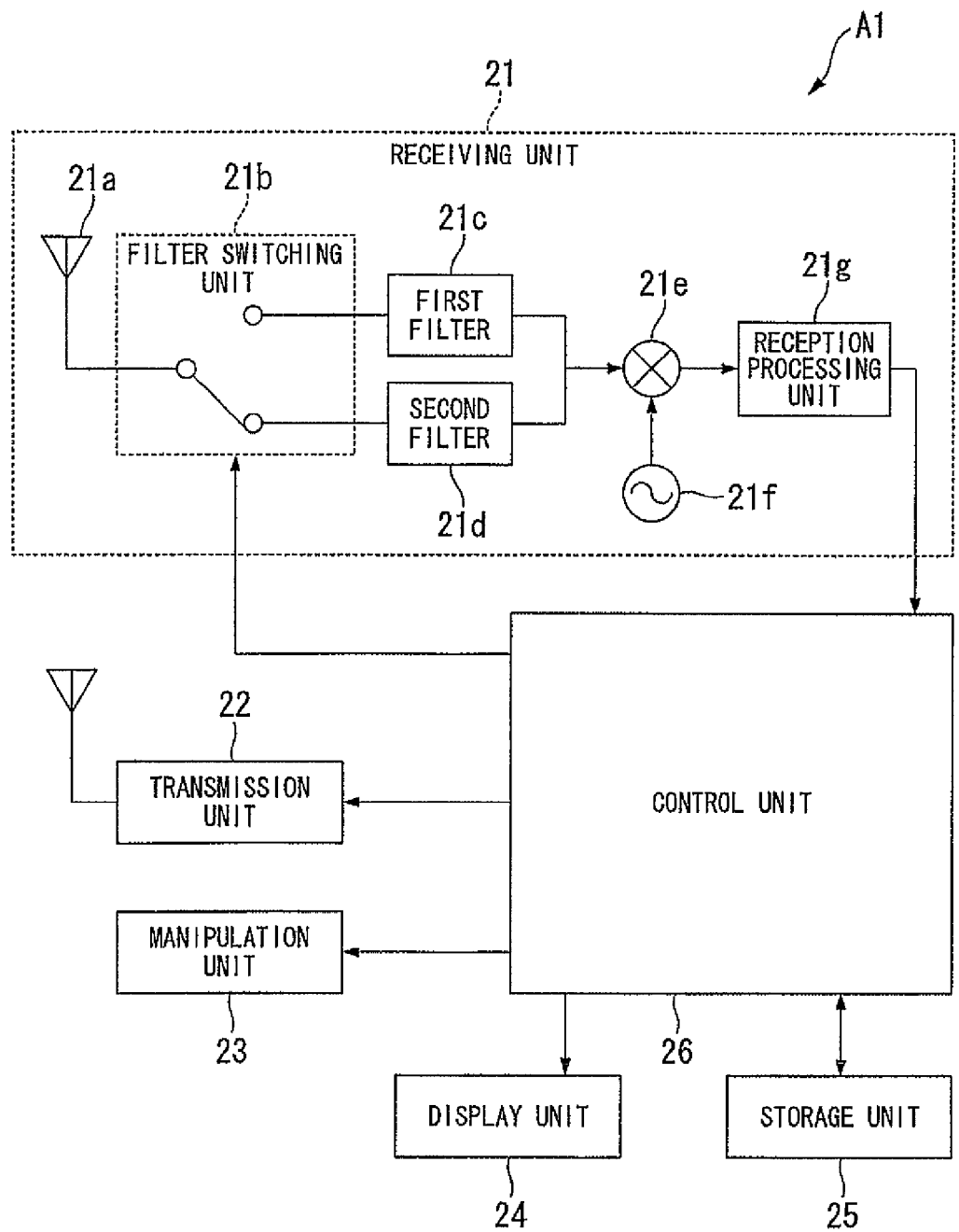
FIG. 8 is a functional block diagram of a PHS terminal A1 according to a second embodiment of the present invention.

FIG. 8 is a functional block diagram of a PHS terminal A1 according to a second embodiment of the present invention. The PHS terminal A1, as illustrated in FIG. 8, includes a receiving unit 21, a transmitting unit 22, a manipulation unit 23, a display unit 24, a storage unit 25, and a control unit 26.

The receiving unit 21 is composed of an antenna 21*a*, a filter switching unit 21*b*, a first filter 21*c*, a second filter 21*d*, a mixer 21*e*, a local oscillator 21*f*, and a reception processing unit 21*g*, and receives various kinds of signals from the base stations based on the instructions of the control unit 26.

The antenna 21*a* receives signals from the base stations. Also, as an output portion of the received signal, the first filter 21*c* or the second filter 21*d* is switched by the filter switching unit 21*b* based on the instruction of the control unit 26.

The first filter 21*c* is a SAW (Surface Acoustic Wave) filter that attenuates unnecessary frequency components except for a desired band of 300 kHz from the received signal input from the antenna 21*a*, and the second filter 21*d* is a SAW filter that attenuates unnecessary frequency components except for a desired band of 900 kHz from the received signal input from the antenna 21*a*. The received signal of which the number of frequency components except for the desired bands has been reduced by the first filter 21*c* and the second filter is output to the mixer 21*e*.

The mixer 21*e* performs frequency conversion (i.e. down conversion) of the received signal into an intermediate frequency by mixing the received signal input from the first filter 21*c* or the second filter 21*d* with the local signal input from the local oscillator 21*f*, and output the intermediate frequency to the reception processing unit 21*g* as the received IF signal. The local oscillator 21*f* generates a local signal for converting the intermediate frequency and outputs the local signal to the mixer 21*e*.

The reception processing unit 21*g* performs A/D conversion and decoding processes of the received IF signal input from the mixer 21*e*, and outputs the processed signal to the control unit 26 as a received baseband signal.

The transmission unit 22, under the control of the control unit 26, transmits various kinds of signals to the base stations. The communication network that is composed of the PHS terminal A1 and the base stations adopts an adaptive modulation method that changes the modulation method of the signal transmitted/received through the communication channel in accordance with the communication state, and the receiving unit 21 and the transmitting unit 22 adopts this adaptive modulation method.

The manipulation unit 23 is composed of various kinds of manipulation keys such as a power key, numeric keys, various kinds of function keys, and the like, and outputs user's manipulation instructions for the manipulation keys to the control unit 26.

The display unit 24, for example, may be a liquid crystal monitor, an organic EL monitor, or the like, and displays various kinds of scenes composed of images, characters, and the like, based on the signals input from the control unit 26.

The storage unit 25 is composed of a ROM (Read Only Memory) and a RAM (Random Access Memory). The ROM stores a predetermined control program that is executed by the control unit 26, and the RAM serves as a predetermined work area when the control unit 26 executes the control program.

The control unit 26 controls the whole operation of the PHS terminal A1 based on the predetermined control program pre-stored in the ROM of the storage unit 25, the signals received in the receiving unit 21, and manipulation instructions received through the manipulation unit 23. In this case, the control program stored in the ROM is provided with a position detection program, and the details of the position detection processing executed by the control unit 26 based on the position detection program will be described hereinafter as the operation of the PHS terminal A1.

Figure 9:
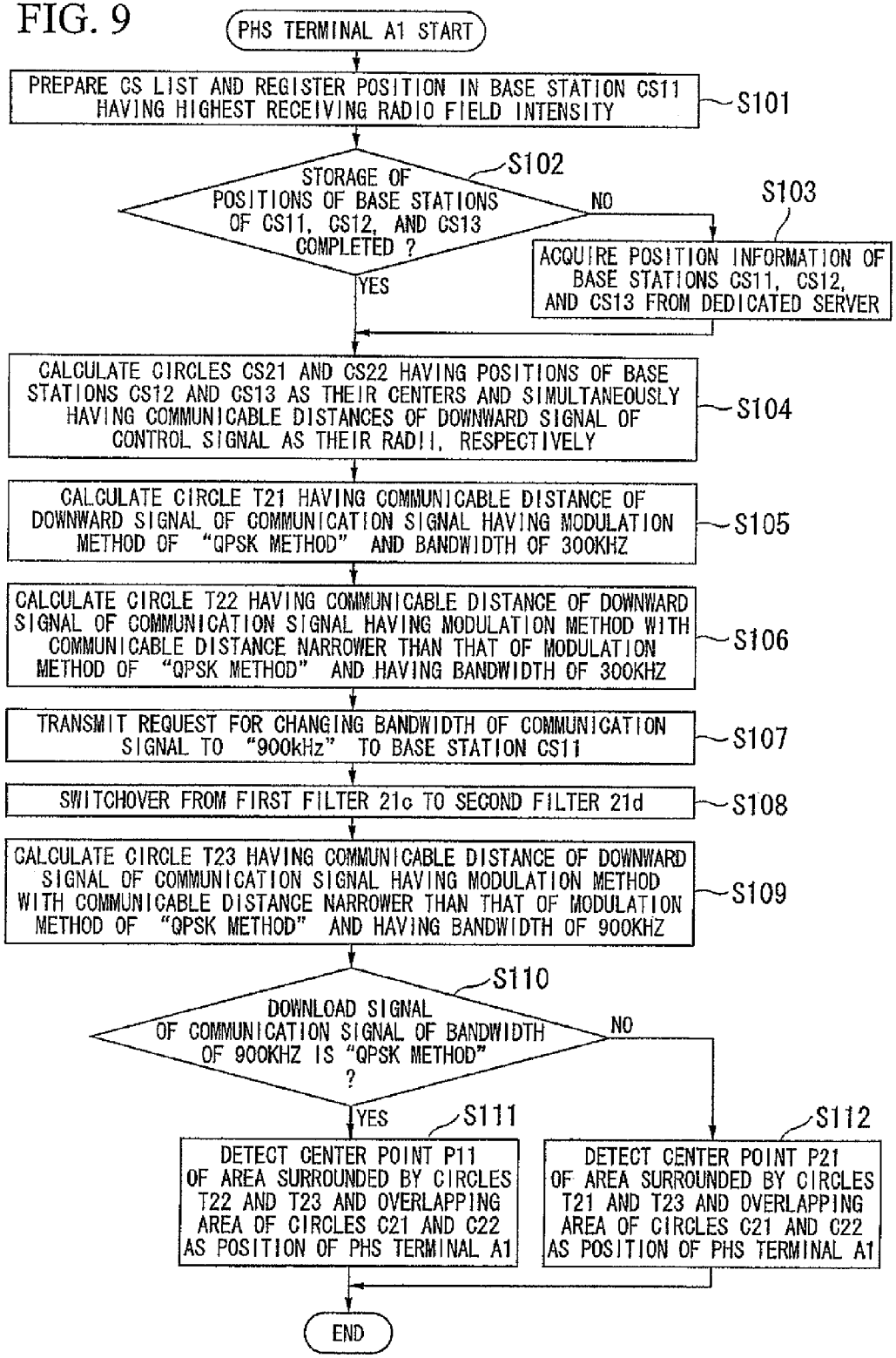
FIG. 9 is a flowchart illustrating an operation of a PHS terminal A1 according to the second embodiment of the present invention.
Figure 10:
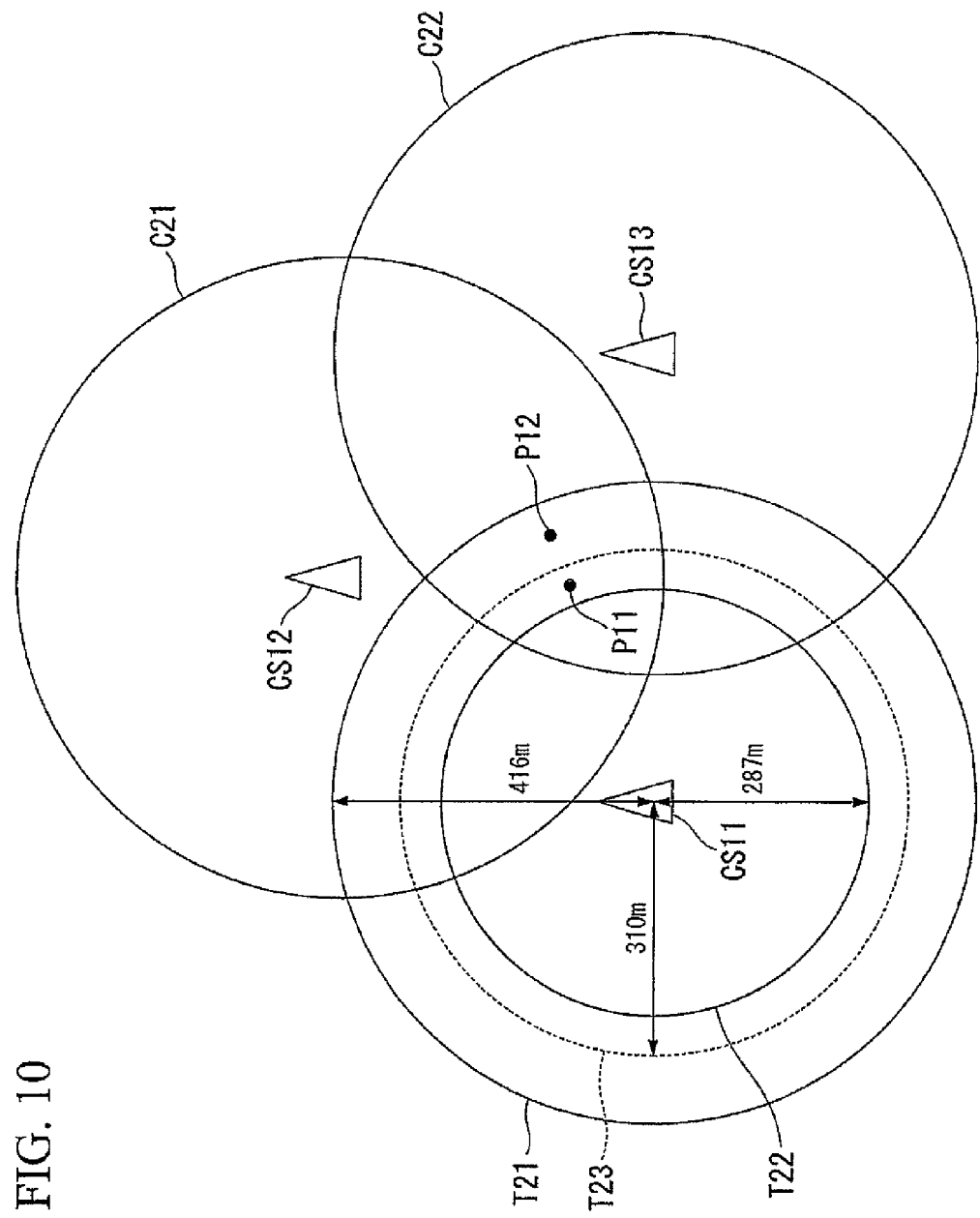
FIG. 10 is a diagram illustrating detection of the position of PHS terminal A1 in a wireless communication system composed of a PHS terminal A1, a base station CS11, a base station CS12, and a base station CS13 according to the second embodiment of the present invention.

Then, the position detection processing of the PHS terminal A1 as configured above will be described in detail with reference to the flowchart of the operation of the PHS terminal A1 as illustrated in FIG. 9, FIG. 10, and FIG. 11. FIG. 10 is a diagram illustrating the position detection of the PHS terminal A1 in a wireless communication system composed of the PHS terminal A1, the base station CS11, the base station CS12, and the base station CS13, and FIG. 11 is a view illustrating the communicable distances of the upward signal and the downward signal for each signal modulation method and bandwidth.

In general, the PHS terminal transmits/receives signals to/from the plurality of base stations, and also transmits/receives the signal to/from one base station of which the position has been registered through the communication channel.

The PHS terminal A1 transmits/receives the signal (i.e. communication signal) to/from the base station CS11 through the communication channel, and transmits/receives the signal (i.e. control signal) to/from the base stations CS12 and CS13 through the control channel. The PHS terminal also calculates the communicable distance of the signals based on the modulation method and bandwidth of the communication signal and the control signal, and detects the position of the PHS terminal A1 based on the communicable distance of the signals. In this case, the communication signals that the PHS terminal A1 transmits to or receives from the base station CS11 adopts the adaptive modulation method that changes the modulation method according to the communication state.

The control unit 26 of the PHS terminal A1 measures the radio field intensities of the control signals that the receiving unit 21 receives from the neighboring base stations CS11, CS12, and CS13 through the control channel, and prepares the CS (Cell Station) list in which the radio field intensities measured for the respective base stations are registered. The control unit 26 stores the CS list in the storage unit 25, and transmits the control signal to the transmitting unit 22 so as to perform the position registration in the base station CS11 having the highest receiving intensity based on the CS list (step S101). In this case, the current modulation method of the communication signal which the PHS terminal A1 transmits to or receives from the base station CS11 may be QPSK (Quadrature Phase Shift Keying) method, and the bandwidth of the communication signal may be 300 kHz.

The control unit 26 determines whether the positions of the base stations CS11, CS12, and CS13 have already been stored in the storage unit 25 (step S102). If the determination in step S102 is "NO", i.e. if it is determined that the positions of the base stations CS11, CS12, and CS13 have not been stored in the storage unit 25, the control unit 26 acquires the positions of the base stations CS11, CS12, and CS13 from the dedicated server through the base station CS11, and stores the acquired positions in the storage unit 25 (step S103).

The control unit 26 calculates the communicable distances of the downward signal of the control signal that the receiving unit 21 receives from the base stations CS12 and CS13 based on the QPSK method that is the modulation method of the control signal and the bandwidth of 300 kHz, and calculates circles having the positions of the base stations CS12 and CS13 as their centers and having the communicable distances of the downward signal of the control signal as their radii, respectively (step S104). In FIG. 10, the circle C21 indicates a circle having the base station CS12 calculated in step S104 as its center, and the circle C22 indicates a circle having the base station CS13 as its center. If the determination in step S102 is "YES" and if the storage unit 25 stores the positions of the base stations CS11, CS12, and CS13, the control unit 26 performs the processing in step S104.

The control unit 26 calculates the communicable distance (e.g. 416 m) of the downward signal of the communication signal that the receiving unit 21 receives based on the QPSK method that is the modulation method of the control signal and the bandwidth of 300 kHz, and calculates a circle having the position of the base station CS11 as its center and having the communicable distance (e.g. 416 m) of the downward signal of the communication signal as its radius (step S105). The circle T21 of FIG. 10 indicates a circle having the base station CS11 calculated in step S105 as its center and having the communicable distance (e.g. 416 m) of the downward signal of the communication signal as its radius.

The communicable distance of the signal in steps S104 and S105 is calculated based on the Okumura-Hata curve (i.e. PCS extension Hata model) formula as indicated in Equation (1) below.

$$Lp = 46.3 + 33.9\log f - 13.82 hb - a(hm) + (44.9 - 6.55\log hb)\log d + CM \quad (1)$$

In Equation (1), Lp is a propagation loss [dB], f is a frequency [MHz], hb is the height [m] of an antenna of a base station, hm is the height [m] of an antenna of a mobile station, d is a communication distance [km], a(hm) is a correction item for the height of the antenna of the mobile station, and CM is a corrected value [dB] of the propagation model.

In the steps S104 and S105, by substituting the propagation loss for the propagation loss Lp in Equation (1), the control unit 26 calculates the communication distance d. In this case, the communication distance d is the communicable distance in the second embodiment of the present invention. The propagation loss substituted for in Equation (1) may be calculated by the following Equations (2a), (3), and (4) based on the modulation method and the bandwidth of the signal. As an example of the communication signal in step S105, the order of calculating the propagation loss will be described.

First, by substituting the bandwidth (e.g. 300 kHz) of the communication signal for the pass bandwidth in Equation (4), available noise power is calculated. Since the necessary SN ratio in Equation (3) is determined based on the modulation method of the communication signal i.e. QPSK method, the receiving sensitivity in Equation (3) is calculated by substituting the available noise power for the thermal noise in Equation (3), and the propagation loss is calculated by substituting the receiving sensitivity in Equation (2a).

In this case, the communicable distances, which are calculated from the Equations (1), (2a), (3), and (4) in accordance with the respective modulation methods and bandwidths, are communicable distances for the respective modulation methods and bandwidths of the signals as illustrated in FIG. 11.

$$\text{(Propagation loss)} = \text{(equivalent isotropically radiated power)} - \text{(receiving sensitivity)} + \text{(receiving antenna gain)} \quad (2a)$$

$$\text{(Receiving sensitivity)} = \text{(thermal noise)} + \text{(necessary SN ratio)} + \text{(noise index)} \quad (3)$$

$$\text{(Available noise power)} = \text{(Boltzmann constant)} \times \text{(absolute temperature)} \times \text{(pass bandwidth)} \quad (4)$$

After the processing of step S105, the control unit 26 calculates the communicable distance (e.g. 287 m) of the downward signal of the communication signal in the case where the modulation method is 8PSK method and the bandwidth is 300 kHz from Equations (1), (2a), (3), and (4) based on the modulation method (e.g. 8PSK method) having the communicable distance that is narrower than that of the modulation method of the current communication signal (e.g. QPSK method) and the bandwidth of 300 kHz, and calculates a circle that is a concentric circle T21 having a communicable distance of 287 m as its radius and having the base station CS11 as its center (step S106). The circle T22 of FIG. 10 indicates a circle having the base station CS11 calculated in step S106 as its center and having the communicable distance of 287 m as its radius.

The control unit 26 makes the transmitting unit 22 transmit a request for changing the bandwidth of the communication signal from 300 kHz to 900 kHz to the base station CS11 (step S107), and makes the filter switching unit 21b perform switchover from the first filter to the second filter (step S108).

The control unit 26 calculates the communicable distance (e.g. 310 m) of the downward signal of the communication signal in the case where the modulation method is QPSK method and the bandwidth is 900 kHz from Equations (1), (2a), (3), and (4) based on the modulation method (e.g. QPSK method) and the bandwidth of 900 kHz, and calculates a circle which is a concentric circle of the circle T21 having the communicable distance of 310 m as its radius and having the base station CS11 as its center (step S109). The circle T23 of FIG. 10 indicates a circle having the base station CS11 calculated in step S107 as its center and having a communicable distance of 310 m as its radius.

The control unit 26 makes the receiving unit 21 receives the downward signal of the communication signal of which the bandwidth transmitted from the base station CS11 has been changed to 900 kHz, and determines whether the modulation method of the communication signal having the received bandwidth of 900 kHz is the QPSK method (step S110). If the determination in step S110 is "YES", i.e. if it is determined that the modulation method of the communication signal of which the bandwidth received by the receiving unit 21 has been changed to 900 kHz is the QPSK method, the control unit 26 calculates an overlapping area of an area surrounded by the circles T22 and T23, the circle C21, and the circle C22, and detects the center point P11 of the overlapping area as the position of the PHS terminal A1 (step S111).

If the determination in step S110 is "NO", i.e. if it is determined that the modulation method of the downward signal of the communication signal, of which the bandwidth received by the receiving unit 21 has been changed to 900 kHz, has been changed to a BPSK (Binary Phase Shift Keying) method having a communicable distance that is wider than that of the QPSK method, the control unit 26 calculates the overlapping area of the area surrounded by the circles T21 and T23, the circle C21, and the circle C22, and detects the center point P12 of the overlapping area as the position of the PHS terminal A1 (step S112).

As described above, according to the second embodiment of the present invention, the circle T21 is calculated on the bases of the modulation method (e.g. QPSK method) and the bandwidth of 300 kHz of the downward signal of the communication signal received by the receiving unit 21, and the circle T22 is calculated based on the modulation method (e.g. 8PSK method) having a communicable distance narrower than that of the modulation method (e.g. QPSK method) and the bandwidth of 300 kHz. Also, the circle T23 is calculated based on the modulation method (e.g. QPSK method) and the bandwidth of 900 kHz, and the circle C21 and the circle C22, in which the downward signal of the control signal corresponds to the communicable distance, are calculated. Also, it can be limited which one between the area surrounded by the circles T23 and T22 and the area surrounded by the circle T21 or the circle T22 the PHS terminal A1 exists in through determining of whether the receiving unit 21 receives the downward signal of the communication signal having the modulation method (i.e. QPSK method) used in calculating the circle T23 and the bandwidth of 900 kHz. Since the position of the PHS terminal A1 is detected from the overlapping area of the limited area, the circle C21, and the circle C22, the communicable distance can be calculated at high accuracy based on the modulation method and the bandwidth in comparison to the case in which only the propagation intensity is used as the parameter. Since the position of the PHS terminal A1 is limited by the circle T23 that is calculated by the change of the bandwidth of the communication signal, the position of the PHS terminal A1 can be detected at high accuracy in comparison to the related art, without the necessity of increasing the number of communicating base stations.

Third Embodiment

Next, a third embodiment of the invention will be described.

Figure 12:
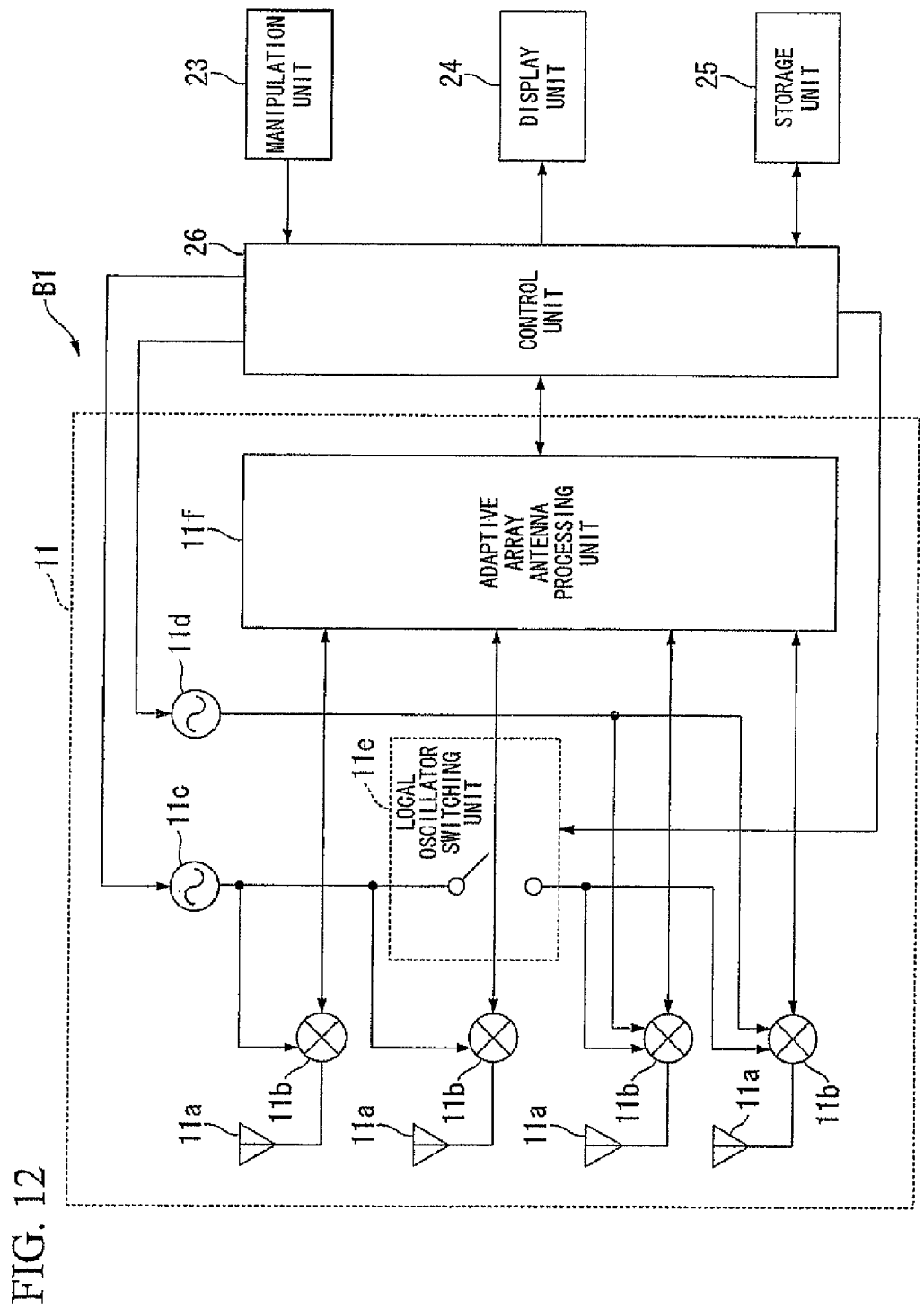
FIG. 12 is a functional block diagram of a PHS terminal 131 according to a third embodiment of the present invention.

FIG. 12 is a functional block diagram of a PHS terminal B1 according to a third embodiment of the present invention. The PHS terminal B1 is different from the PHS terminal A1 according to the second embodiment of the present invention on the point that an adaptive array antenna communication unit 11 including an adaptive array antenna is provided instead of the receiving unit 21 and the transmitting unit 22 that receive and transmit signals. Accordingly, in the PHS terminal B1, the same reference numerals are assigned to the same functional constituent elements as those of the PHS terminal A1 in the second embodiment, and the explanation thereof will be omitted.

The PHS terminal B1 includes a manipulation unit 23, a display unit 24, a storage unit 25, a control unit 26, and an adaptive array antenna communication unit 11.

The adaptive array antenna communication unit 11 that is the change constituent element, includes antennas 11a, mixers 11b, a first local oscillator 11c, a second local oscillator 11d, a local oscillator switching unit 11e, and an adaptive array antenna processing unit 11f, and transmits/receives signals to/from the base stations through a communication channel and a control channel based on the instruction from the control unit 26.

The four antennas 11a output signals received from the base stations to the mixers 11b. The mixers 11b down-converts the received signals into intermediate frequencies by mixing the received signals input from the antennas 11a with local signals input from the first local oscillator 11c or the second local oscillator, and output the intermediate frequencies to the adaptive array antenna processing unit 11f as the receive IF signals.

The first local oscillator 11c or the second local oscillator outputs different local signals to the mixers 11b. The local oscillator switching unit 11e, under the control of the control unit 26, performs switchover between a first local oscillator operation mode in which the local signal from the first local oscillator 11c is input to the mixers 11b and a second local oscillator operation mode in which the local signal from the first local oscillator 11c is input to the two mixers among the four mixers 11b and the local signal from the second local oscillator 11d is input to the remaining two mixers. If the four antennas 11a receive signals of the same frequency band, the control unit 26 makes the local oscillator switching unit 11e perform switchover to the first local oscillator operation mode, while if every two antennas 11a receive signals of different frequency bands, the control unit 26 makes the local oscillator switching unit 11e perform switchover to the second local oscillator operation mode.

The adaptive array antenna processing unit 11f converts the respective received IF signals input from the mixer 11b into received baseband signals, performs phase control and amplitude control by multiplying the respective received baseband signals by phase coefficients and amplitude coefficients, and generates a received signal by synthesizing the received baseband signals of which the phase control and the amplitude control have been performed to output the received signal to the control unit 26.

The control unit 26 controls the whole operation of the PHS terminal A1 based on the predetermined control program pre-stored in the ROM of the storage unit 25, the signals transmitted or received by the adaptive array antenna communication unit 11, and manipulation instructions received through the manipulation unit 23. The details of the position detection processing executed by the control unit 26 will be described hereinafter as the operation of the PHS terminal B1.

Figure 13:
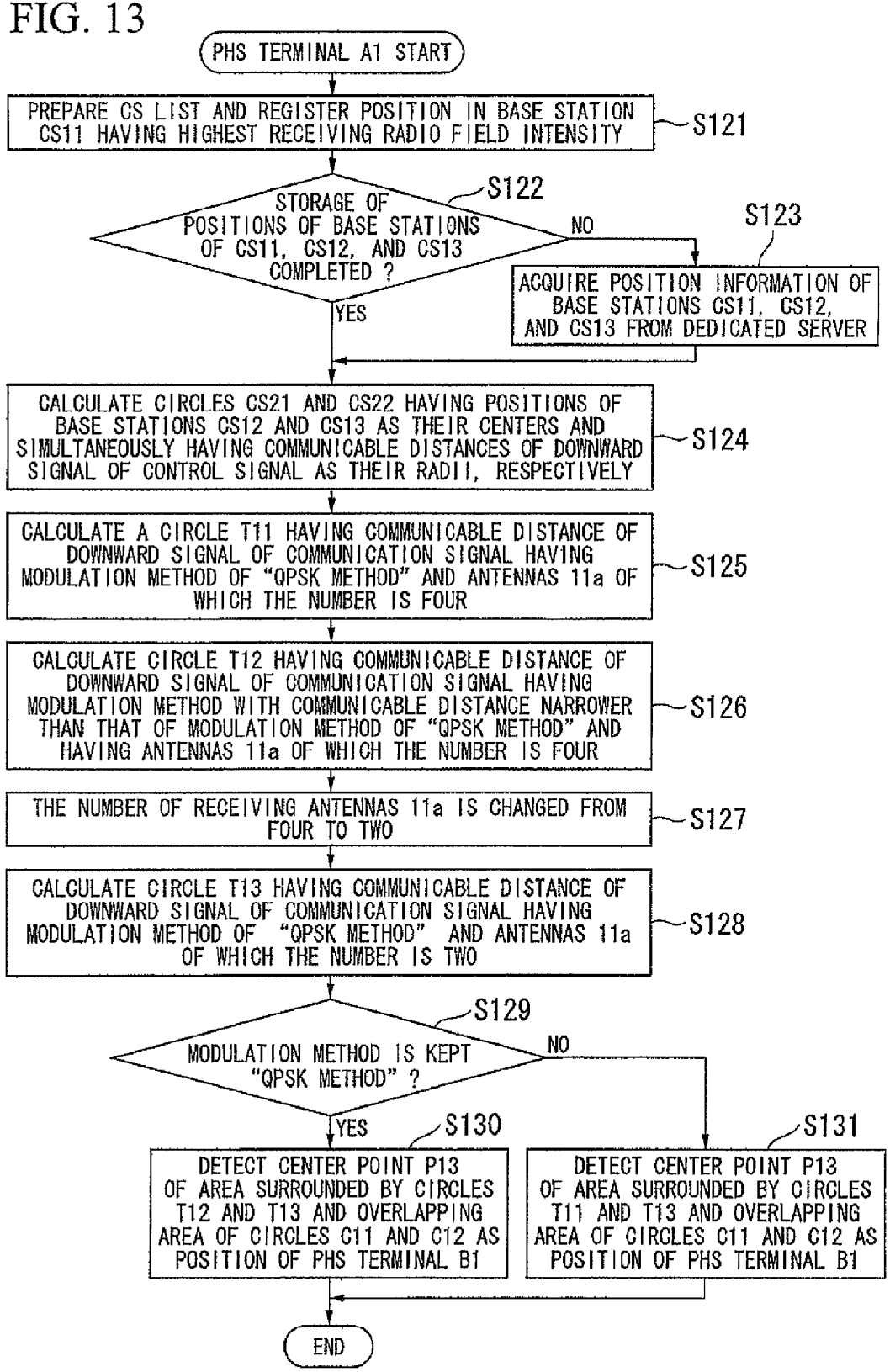
FIG. 13 is a flowchart illustrating an operation of a PHS terminal B1 according to the third embodiment of the present invention.
Figure 14:
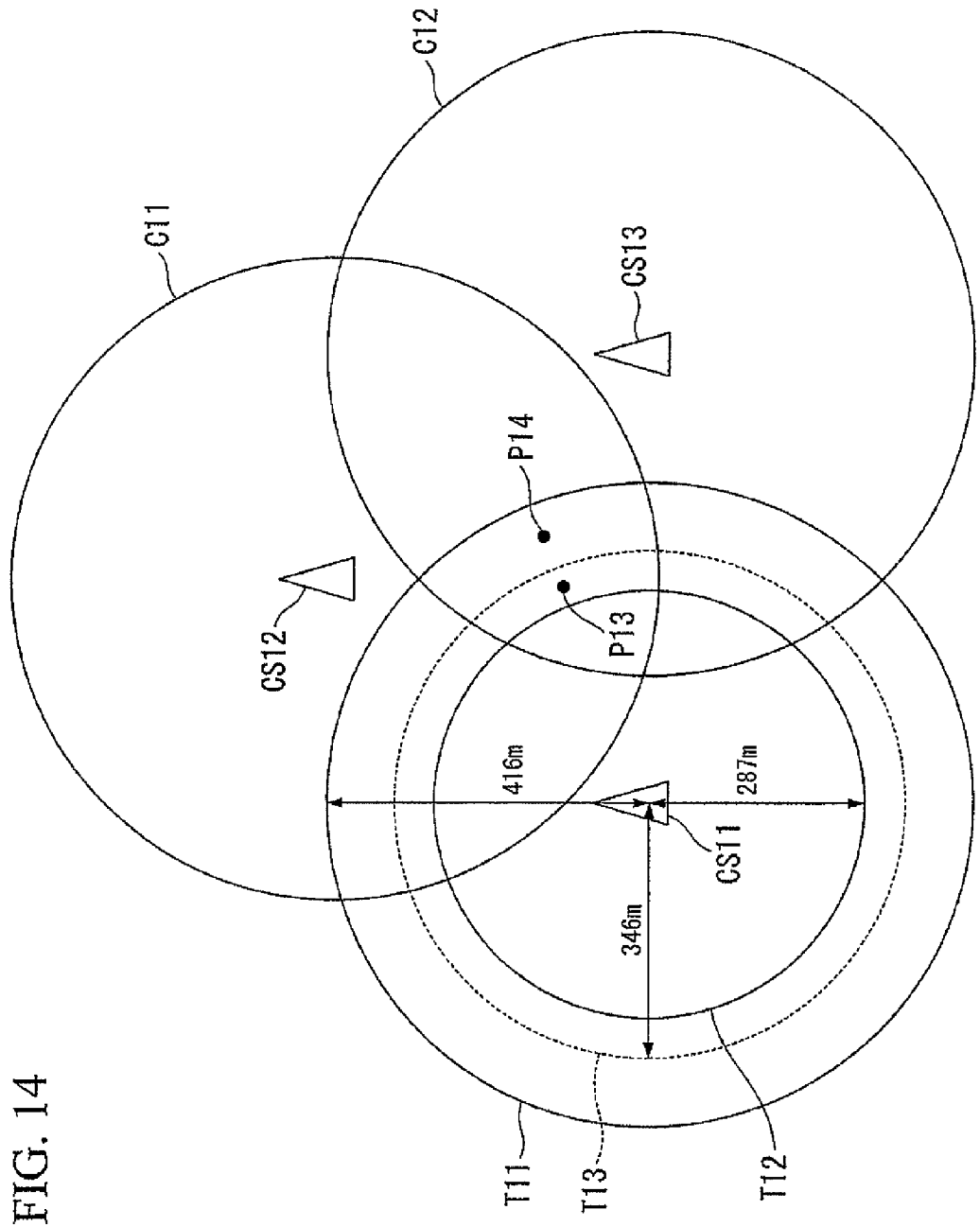
FIG. 14 is a diagram illustrating detection of the position of PHS terminal A1 in a wireless communication system composed of a PHS terminal B1, a base station CS11, a base station CS12, and a base station CS13 according to the third embodiment of the present invention.

Then, the position detection processing of the PHS terminal B1 as configured above will be described in detail with reference to the flowchart of the operation of the PHS terminal B1 as illustrated in FIG. 13, FIG. 14, and FIG. 15. FIG. 14 is a diagram illustrating the position detection of the PHS terminal B1 in a wireless communication system composed of the PHS terminal B1, the base station CS11, the base station CS12, and the base station CS13, and FIG. 15 is a view illustrating the communicable distances of the downward signal for each signal modulation method and antenna.

Since step S121 in the third embodiment is the same as the step S101 in the second embodiment, step S122 in the third embodiment is the same as the step S102 in the second embodiment, and step S123 in the third embodiment is the same as the step S103 in the second embodiment, the explanation thereof will be omitted. In this case, it is assumed that the current communication method of the communication signals that the PHS terminal B1 transmits to or receives from the base station CS11 is the QPSK (Quadrature Phase Shift Keying) method.

The control unit 26 calculates the communicable distances of the downward signal of the control signal that the adaptive array antenna communication unit 11 receives from the base stations CS12 and CS13 based on the QPSK method that is the modulation method of the control signal and the number (e.g. four) of antennas 11a that receive the downward signal of the control signal, and calculates circles having the positions of the base stations CS12 and CS13 as their centers and having the communicable distances of the downward signal of the control signal as their radii, respectively (step S124). In FIG. 14, the circle C11 indicates a circle having the base station CS12 calculated in step S124 as its center, and the circle C12 indicates a circle having the base station CS13 as its center.

The control unit 26 calculates the communicable distance (e.g. 416 m) of the downward signal of the communication signal based on the QPSK method that is the modulation method of the control signal and the number (e.g. four) of antennas 11a that receive the downward signal of the communication signal, and calculates a circle having the position of the base station CS11 as its center and having the calculated communicable distance (e.g. 416 m) of the downward signal of the communication signal as its radius (step S125).

The circle T11 of FIG. 14 indicates a circle having the base station CS11 calculated in step S125 as its center and having the communicable distance (e.g. 416 m) of the downward signal of the communication signal as its radius.

In the steps S124 and S125, the control unit 26 calculates the communicable distance of the signal from the Equations (1), (2a), and (3) and the following Equation (5) based on the signal modulation method and the number of antennas 11a that receive the signals.

$$(\text{Antenna gain})=10\log(\text{the number of antennas}) \quad (5)$$

As an example of the communication signal in step S125, the order of calculating the communicable distance will be described.

First, by substituting the number (e.g. four) of antennas 11a that receive the downward signal of the communication signal for the number of antennas in Equation (5), the antenna gain of 6 dB is calculated. In the case where the number of antennas is four, the antenna gain of 6 dB becomes a reference value of a transmission antenna gain included in the equivalent isotropically radiated power. In the case where the number of antenna is two, the antenna gain of 3 dB is calculated from the Equation (5), and the difference in antenna gain (i.e. 3 dB) between the case where the number of antennas is four and the case where the number of antennas is two is subtracted from the equivalent isotropically radiated power. Then, the necessary SN ratio of Equation (3) is determined based on the QPSK that is the modulation method of the communication signal, and the receiving sensitivity of Equation (3) is calculated. Then, by substituting the receiving antenna gain of the PHS terminal B1 for the receiving antenna gain of Equation (2a) and substituting the receiving sensitivity of Equation (3) for the receiving sensitivity in Equation (2a), the propagation loss is calculated. Then, by substituting the propagation loss for the propagation loss Lp in Equation (1), the communication distance d is calculated. In this case, the communication distance is the communicable distance in the third embodiment.

In accordance with the modulation method and the number of antennas that receive the signals, the communicable distance calculated from the Equations (1), (2a), (3), and (5) becomes the communicable distance for each modulation method and antenna as shown in FIG. 15.

After the processing of step S125, the control unit 26 calculates the communicable distance (e.g. 287 m) of the downward signal of the communication signal in the case where the modulation method is 8PSK method and the number of antennas is four from the Equations (1), (2a), (3), and (5) based on the modulation method (e.g. 8PSK method) having the communicable distance that is narrower than that of the modulation method of the current communication signal (e.g. QPSK method) and the number (e.g. four) of antennas 11a that receive the downward signal of the communication signal, and calculates a circle which is a concentric circle of the circle T11 having the communicable distance of 287 m as its radius and having the base station CS11 as its center (step S126). The circle T12 of FIG. 14 indicates a circle having the base station CS11 calculated in step S126 as its center and having the communicable distance of 287 m as its radius.

The control unit 26 makes the local oscillator switching unit 11e perform switchover from the first local oscillator operation mode to the second local oscillator operation mode, and changes the downward signal of the communication signal, which is transmitted from the base station CS11 and is received by four antennas 11a, to the downward signal of the communication signal, which is transmitted from the base station CS11 and is received by two antennas 11a (step S127).

The control unit 26 calculates the communicable distance (e.g. 346 m) of the downward signal of the communication signal in the case where the modulation method is QPSK method and the number of antennas 11a is two from the Equations (1), (2a), (3), and (5) based on the modulation method of the communication signal (e.g. QPSK method) and the number (e.g. two) of receiving antennas 11a, and calculates a circle which is the concentric circle of the circle T11 having the communicable distance of 346 m as its radius and having the base station CS11 as its center (step S128). The circle T13 of FIG. 10 indicates the circle having the base station CS11 calculated in step S128 as its center and having the communicable distance of 310 m as its radius.

The control unit 26 determines whether the modulation method of the downward signal of the communication signal that is received from the base station CS11 through the change of the number of receiving antennas to two is QPSK method (step S129).

If the determination in step S129 is "NO", i.e. if it is determined that the modulation method of the downward signal of the communication signal that is received by the adaptive array antenna communication unit 11 is the QPSK method, the control unit 26 calculates an overlapping area of an area surrounded by the circle T12 and the circle T13, the circle C11, and the circle C12, and detects the center point P13 of the overlapping area as the position of the PHS terminal B1 (step S130).

If the determination in step S129 is "NO", i.e. if it is determined that the modulation method of the communication signal that is received by the adaptive array antenna communication unit 11 has been changed to the BPSK (Binary Phase Shift Keying) method having a communicable distance that is wider than that of the QPSK method, the control unit 26 calculates the overlapping area of the area surrounded by the circles T11 and T13, the circle C11, and the circle C12, and detects the center point P14 of the overlapping area as the position of the PHS terminal A1 (step S131).

As described above, according to the third embodiment of the present invention, the circle T11 is calculated on the bases of the modulation method (e.g. QPSK method) of the downward signal of the communication signal received by the receiving unit 21 and the number (e.g. four) of receiving antennas 11a, and the circle T12 is calculated based on the modulation method (e.g. 8PSK method) having a communicable distance narrower than that of the modulation method (e.g. QPSK method) and the number (e.g. four) of receiving antennas 11a. Also, the circle T13 is calculated based on the modulation method (e.g. QPSK method) and the number (e.g. two) of antennas 11a, and the circle C21 and the circle C11, in which the downward signal of the control signal corresponds to the communicable distance, are calculated. Also, it can be limited which one between the area surrounded by the circles T13 and 12 and the area surrounded by the circle T11 or the circle T12 the PHS terminal B1 exists in through determining of whether the adaptive antenna communication unit 11 receives the downward signal of the communication signal having the modulation method (i.e. QPSK method) used in calculating the circle T13 and the number (e.g. two) of receiving antennas 11a. Since the position of the PHS terminal B1 is detected from the overlapping area of the limited area, the circle C11, and the circle C11, the communicable distance can be calculated at high accuracy based on the modulation method and the number of receiving antennas 11a in comparison to the case in which only the propagation intensity is used as the parameter. Since the position of the PHS terminal 131 is limited by the circle T13 that is calculated by the change of the number of receiving antennas 11a that receive the communication signal, the position of the PHS terminal B1 can be detected at high accuracy in comparison to the related art, without the necessity of increasing the number of communicating base stations.

As described above, although one embodiment of the present invention has been described, the present invention is not limited thereto, and the following modifications may be considered.

(1) In the above-described embodiment, the position detection processing is performed by the PHS terminal A1 and the PHS terminal B1, but the present invention is not limited thereto, and the base station may perform the position detection of the PHS terminal.

For example, the base station CS11 may detect the position of the PHS terminal by acquiring the communication information about the positions of the base stations CS12 and CS13 and the modulation method of the control signal from the PHS terminal, calculating circles having the base stations CS12 and CS13 as their centers based on the communication information, and changing bandwidth of the communication signal and the number of antennas used by the base station CS11 to receive the communication signal.

(2) In the above-described embodiment, the communicable distance of the signal is calculated based on the modulation method, the bandwidth, or the number of antennas that receive the signals, and the position is detected based on the calculated communicable distance. However, the present invention is not limited thereto. For example, the communicable range of the signal may be calculated based on the receiving bandwidth of the signal, FER (frame error rate), and the like, rather than the modulation method, and the positions of the PHS terminal A1 and the PHS terminal B1 may be detected.

(3) In the above-described embodiment, the communicable distance is calculated using the Okumura-Hata Curve (i.e. PCS extension Hata model) formula. However, the present invention is not limited thereto.

For example, the communicable distance may be calculated using the Walfisch-Ikegami equation or the Sakagami equation, rather than the Okumura-Hata Curve (i.e. PCS extension Hata model) formula, and the positions of the PHS terminal A1 and the PHS terminal B1 may be detected.

(4) In the above-described embodiment, the position detection is performed mainly using the communicable distance of the downward signal. However, the present invention is not limited thereto.

For example, the position detection may be performed using the communicable distance obtained from the modulation method of an upward signal.

INDUSTRIAL APPLICABILITY

According to the present invention, the appropriate communicable distances of the signals transmitted/received by the portable terminal or the base stations can be calculated in accordance with the environment where the signals are propagated, and thus the present invention can be applied to a portable terminal, a base station, and a method of specifying the position of the portable terminal, which can specify the position of the portable terminal at higher accuracy than that of the related art.

Also, the present invention can be applied to a portable terminal, a base station, and a method of specifying the position of a portable terminal, which can specify the position of the portable terminal at higher accuracy than that of the related art even without increasing the number of communicating base stations.

The invention claimed is:

1. A portable terminal comprising:
   a communication unit that transmits/receives a signal modulated by a predetermined modulation method to/from three or more base stations;
   a storage unit which stores in advance a plurality of propagation models indicating propagation environments of the signal for respective combinations of the base stations and stores in advance position information of the base stations; and
   a control unit that controls the communication unit and the storage unit;
   wherein the control unit specifies a propagation model that corresponds to a combination of the base stations among the plurality of propagation models stored in the storage unit based on the signal and calculates communicable distances of the signal based on the corresponding propagation model, calculates circles having the corresponding communicable distances as their radii and having positions of the base stations as their centers, respectively, obtains an overlapping area where the circles overlap one another, and specifies the center position of the overlapping area as the position of the portable terminal.

2. The portable terminal according to claim 1, wherein if the overlapping area does not exist, the control unit changes the specified propagation model to another propagation model among the plurality of propagation models stored in the storage unit, obtains the overlapping area based on the corresponding propagation model, and stores the corresponding propagation model in the storage unit.

3. The portable terminal according to claim 1, wherein the communication unit transmits/receives the signal of which the modulation method is changed according to the communication state to/from the base stations; and
   the control unit calculates a concentric circle which is smaller than the circles and has a communicable distance based on the modulation method having a communicable range that is narrower than that of the modulation method of the signal as its radius, and limits the overlapping area by the concentric circle.

4. The portable terminal according to claim 1, wherein the communication unit performs transmission/reception of the signal with one of the base stations through a communication channel, and performs transmission/reception of the signal with other base stations through a control channel.

5. A portable terminal comprising:
   a communication unit that transmits/receives a first signal of which the modulation method is changed according to a communication state to/from a first base station and transmits/receives a second signal of which the modulation method is fixed to/from a plurality of second base stations that are different from the first base station; and
   a control unit that specifies its own position based on the first and second signals;
   wherein the control unit calculates a first communicable distance that is the current communicable distance of the first signal, and calculates a first circle which has the corresponding first communicable distance as its radius and has the first base station as its center;
   calculates a second communicable distance from the modulation method having a communicable distance that is shorter than that of the current modulation method of the first signal, and calculates a second circle which has the corresponding second communicable distance as its radius and has the first base station as its center;
   calculates a third circle which has a third communicable distance between the first communicable distance and the second communicable distance as its radius and has the first base station as its center;
   calculates a fourth communicable distance that is the communicable distance of the second signal, and calculates a plurality of fourth circles which have the corresponding fourth communicable distance as their radii and have the second base station as their centers, respectively; and
   changes the communicable distance of the first signal from the first communicable distance to the third communicable distance by a process of changing the communicable distance, and if the communication unit is able to transmit/receive the first signal of which the communicable distance has become the third communicable distance, specifies the center of an overlapping area between an area surrounded by the second circle and the third circle and the fourth circle as its position, while if the communication unit is unable to transmit/receive the first signal of which the communicable distance has become the third communicable distance, specifies the center of an overlapping area between an area surrounded by the first circle and the third circle and the fourth circle as its position.

6. The portable terminal according to claim 5, wherein the control unit changes the bandwidth of the first signal or changes the bandwidth and a modulation method of the first signal by the process of changing the communicable distance.

7. The portable terminal according to claim 5, wherein the communication unit has an adaptive array antenna composed of a plurality of antenna elements; and
   the control unit reduces the number of antenna elements of the communication unit that is used in transmission/reception of the first signal, or reduces the number of antenna elements of the communication unit that is used in transmission/reception of the first signal and changes the modulation method of the first signal as the communicable distance change processing.

8. The portable terminal according to claim 5, wherein the first signal is a signal that is transmitted/received through the communication channel, and the second signal is a signal that is transmitted/received through the control channel.

9. A base station that transmits/receives a signal modulated by a predetermined modulation method to/from a portable terminal communicating with three or more base stations, the base station comprising:
   a communication unit that transmits/receives the signal to/from the portable terminal;
   a storage unit which stores in advance a plurality of propagation models indicating propagation environments of the signal that the portable terminal transmits/receives for respective combinations of the base stations with which the portable terminal communicates, and stores in advance position information of the base stations; and
   a control unit that controls the communication unit and the storage unit;
   wherein the control unit acquires communication information about the base stations with which the portable terminal communicates through the communication unit and a modulation method of the signal in the communication from the portable terminal, specifies a propagation model which corresponds to a combination of the base stations with which the portable terminal communicates and is stored in the storage unit based on the corresponding communication information and the signal that the communication unit transmits to or receives from the portable terminal and calculates communicable distances of the signal that the portable terminal transmits to or receives from the respective base stations based on the corresponding propagation model, calculates circles having the corresponding communicable distances as their radii and having positions of the base stations as their centers, respectively, obtains an overlapping area where the circles overlap one another, and specifies the center position of the overlapping area as the position of the portable terminal.

10. The base station according to claim 9, wherein if the overlapping area does not exist, the control unit changes the specified propagation model to another propagation model, obtains the overlapping area based on the corresponding propagation model, and stores the corresponding propagation model in the storage unit.

11. The base station according to claim 9, wherein the communication unit transmits/receives the signal of which the modulation method is changed according to the communication state to/from the portable terminal; and
the control unit calculates a concentric circle which is smaller than the circles and has the communicable distance based on the modulation method having a communicable range that is narrower than that of the modulation method of the signal as its radius, and limits the overlapping area by the concentric circle.

12. A first base station that transmits/receives a first signal to/from a portable terminal which transmits/receives the first signal of which the modulation method is changed according to a communication state to/from the first base station and transmits/receives a second signal of which the modulation method is fixed to/from other second base stations that are different from the first base station, the first base station comprising:
a communication unit that transmits/receives the first signal to/from the portable terminal; and
a control unit that specifies a position of the portable terminal based on the first signals;
wherein the control unit acquires communication information about communication of the portable terminal with the second base stations from the first signal that the communication unit receives from the portable terminal;
calculates a first communicable distance that is the current communicable distance of the first signal, and calculates a first circle which has the corresponding first communicable distance as its radius and has the first base station as its center;
calculates a second communicable distance from the modulation method having a communicable distance that is shorter than that of the current modulation method of the first signal, and calculates a second circle which has the corresponding second communicable distance as its radius and has the first base station as its center;
calculates a third circle which has a third communicable distance between the first communicable distance and the second communicable distance as its radius and has the first base station as its center;
calculates a fourth communicable distance that is the communicable distance of the second signal based on the communication information, and calculates a plurality of fourth circles which have the corresponding fourth communicable distance as their radii and have the second base station as their centers, respectively; and
changes the communicable distance of the first signal from the first communicable distance to the third communicable distance by a process of changing the communicable distance, and if the first signal of which the communicable distance has become the third communicable distance is able to be transmitted to or received from the portable terminal, specifies the center of an overlapping area between an area surrounded by the second circle and the third circle and the fourth circle as the position of the portable terminal, while if the first signal of which the communicable distance has become the third communicable distance is unable to be transmitted to or received from the portable terminal, specifies the center of an overlapping area between an area surrounded by the first circle and the third circle and the fourth circle as the position of the portable terminal.

13. The base station according to claim 12, wherein the control unit changes the bandwidth of the first signal or changes the bandwidth and a modulation method of the first signal by the process of changing the communicable distance.

14. The base station according to claim 12, wherein the communication unit has an adaptive array antenna composed of a plurality of antenna elements; and
the control unit reduces the number of antenna elements of the communication unit that is used in transmission/reception of the first signal, or reduces the number of antenna elements of the communication unit that is used in transmission/reception of the first signal and changes the modulation method of the first signal.

15. A method of specifying the position of a portable terminal that transmits/receives a signal in which a predetermined modulation method is used to/from three or more base stations, the method comprising:
based on the signal that the portable terminal transmits to or receives from the base stations, calculating communicable distances based on a propagation model and the modulation method;
calculating a plurality of circles having the corresponding communicable distances as their radii and having the positions of the base stations as their centers, respectively;
obtaining an overlapping area where the circles overlap one another; and
specifying the center position of the overlapping area as the position of the portable terminal.

16. A method of specifying the position of a portable terminal that transmits/receives a first signal of which the modulation method is changed according to a communication state to/from a first base station and transmits/receives a second signal of which the modulation method is fixed to/from a plurality of second base stations that are different from the first base station, the method comprising:
calculating a first communicable distance that is the current communicable distance of the first signal, and calculating a first circle which has the corresponding first communicable distance as its radius and has the first base station as its center;
calculating a second communicable distance from the modulation method having a communicable distance that is shorter than that of the current modulation method of the first signal, and calculating a second circle which has the corresponding second communicable distance as its radius and has the first base station as its center;
calculating a third circle which has a third communicable distance between the first communicable distance and the second communicable distance as its radius and has the first base station as its center;
calculating a fourth communicable distance that is the communicable distance of the second signal, and calculating a plurality of fourth circles which have the corresponding fourth communicable distance as their radii and have the second base station as their centers, respectively; and changing the communicable distance of the first signal from the first communicable distance to the third communicable distance by a process of changing the communicable distance, and if the portable terminal is able to transmit/receive the first signal of which the communicable distance has become the third communicable distance, specifying the center of an overlapping area between an area surrounded by the second circle and the third circle and the fourth circle as the position of the portable terminal, while if the portable terminal is unable to transmit/receive the first signal of which the communicable distance has become the third communicable distance, specifying the center of an overlapping area between an area surrounded by the first circle and the third circle and the fourth circle as the position of the portable terminal.

* * * * *